United States Patent [19]
Yardley et al.

[11] Patent Number: 5,127,486
[45] Date of Patent: Jul. 7, 1992

[54] SYSTEM FOR SENSING ARRIVAL OF AN AUTOMATIC GUIDED VEHICLE AT A WIRE

[75] Inventors: James V. Yardley, Centerville; Gary L. Whatcott, Holladay; John A. M. Petersen, Bountiful, all of Utah

[73] Assignee: Eaton-Kenway, Inc., Salt Lake City, Utah

[21] Appl. No.: 617,315

[22] Filed: Nov. 23, 1990

[51] Int. Cl.$^5$ .............................................. B62D 1/24
[52] U.S. Cl. ................................... 180/168; 318/587; 340/941; 340/988; 364/424.02; 364/449
[58] Field of Search ................. 180/167, 168, 6.48, 180/6.5; 318/587; 340/933, 941, 988; 364/424.02, 449

[56] References Cited

U.S. PATENT DOCUMENTS

| | | | |
|---|---|---|---|
| 1,799,576 | 4/1931 | Wildhaber | 343/855 |
| 2,246,385 | 6/1941 | Schaper | 250/40 |
| 3,009,525 | 11/1961 | De Liban | 180/82 |
| 3,033,305 | 5/1962 | Harned et al. | 180/79.1 |
| 3,147,817 | 9/1964 | De Liban | 180/82 |
| 3,187,260 | 6/1965 | Dove | 328/57 |
| 3,198,279 | 8/1965 | Quinn | 180/79 |
| 3,431,996 | 3/1969 | Giles et al. | 180/98 |
| 3,544,788 | 12/1970 | Guzik | 246/63 |
| 3,556,244 | 1/1971 | Gray | 180/98 |
| 3,617,769 | 11/1971 | Hanson | 307/229 |
| 3,628,624 | 12/1971 | Waerner | 180/98 |
| 3,683,378 | 8/1972 | Polhemus | 343/7 ED |
| 3,693,028 | 9/1972 | Fussell | 307/235 |
| 3,734,229 | 5/1971 | Comer | 180/98 |
| 3,757,887 | 11/1973 | Moore | 180/98 |
| 3,773,136 | 11/1973 | Palazzetti et al. | 180/168 |
| 3,849,636 | 11/1974 | Helms | 235/150 |
| 4,007,382 | 2/1977 | Warberg | 307/236 |
| 4,010,409 | 3/1977 | Waites | 318/587 |

(List continued on next page.)

FOREIGN PATENT DOCUMENTS

| | | |
|---|---|---|
| 50101 | 1/1981 | European Pat. Off. . |
| 77985 | 5/1983 | European Pat. Off. . |
| 108812 | 5/1984 | European Pat. Off. . |
| 124260 | 11/1984 | European Pat. Off. . |
| 193985 | 9/1986 | European Pat. Off. . |
| 206443 | 12/1986 | European Pat. Off. . |
| 2428583 | 1/1976 | Fed. Rep. of Germany . |
| 2722222 | 3/1978 | Fed. Rep. of Germany . |
| 2801045 | 9/1978 | Fed. Rep. of Germany . |
| 2833897 | 3/1979 | Fed. Rep. of Germany . |
| 2947116 | 7/1980 | Fed. Rep. of Germany . |
| 2920181 | 11/1980 | Fed. Rep. of Germany ...... 180/168 |
| 3136355 | 3/1983 | Fed. Rep. of Germany . |
| 2336726 | 7/1977 | France . |
| 2375579 | 7/1978 | France . |
| 2526181 | 4/1983 | France . |
| 0118602 | 9/1981 | Japan .................................. 340/941 |
| 59-135514 | 1/1983 | Japan . |
| 0112215 | 5/1986 | Japan .............................. 364/424.02 |
| WO80/02013 | 10/1980 | PCT Int'l Appl. . |
| 0650538 | 3/1979 | U.S.S.R. ............................. 180/168 |
| 2143395 | 5/1984 | United Kingdom . |
| 2158965 | 5/1984 | United Kingdom . |
| 8501012 | 1/1985 | United Kingdom . |

OTHER PUBLICATIONS

Japanese Abstract vol. 5, No. 66, May 2, 1981.
IBM Publ. vol. 27 No. 4A, Sep. 1984.
German Publ. "Rechnergestutzte . . ." pub. date unknown.
Nov. 1990 article in Material Handling Engineering entitled "AGVS: Latest Developments in Guidance Systems", pp. 53–54, 56, 60.
Cyplex Literature: High Performance AGV Guidance and Communications; copyright 1989.
Wiredriver 2 Users Guide, short form catalog, Jan., 1989.

*Primary Examiner*—Andres Kashnikow
*Assistant Examiner*—Brian L. Johnson
*Attorney, Agent, or Firm*—Lynn G. Foster

[57] ABSTRACT

Apparatus for detecting an automatic guided vehicle's longitudinal position and to enable positioning of the vehicle at a load pickup/delivery terminal or other place. In one arrangement a mat having a passive short-circuited loop of wire embedded in it is positioned on the floor. On the vehicle an oscillator and a transmitting antenna provide a primary magnetic field that excites the loop in the mat, inducing current in the loop. The loop current produces a secondary magnetic field. Magnetic receiving antennas on the vehicle detect the secondary magnetic field that is caused by portions of the loop that cross the longitudinal axis of the vehicle. Onboard electronic apparatus ascertains and can control the longitudinal position of the vehicle relative to the mat. The same on-board apparatus enables the vehicle to detect a directly energized (connected to a power source) guidewire in the floor that lies across the vehicle's path between terminals and at terminals. The vehicle can also navigate between terminals by dead reckoning.

14 Claims, 29 Drawing Sheets

U.S. PATENT DOCUMENTS

| | | | |
|---|---|---|---|
| 4,020,487 | 4/1977 | Winter | 341/170 |
| 4,023,753 | 5/1977 | Dobler | 246/5 |
| 4,043,418 | 8/1977 | Blakeslee | 318/587 X |
| 4,083,008 | 4/1978 | Eschke | 325/163 |
| 4,088,939 | 5/1978 | Mitschke | 318/376 |
| 4,097,808 | 6/1978 | Parke | 325/51 |
| 4,127,182 | 11/1978 | Thole | 180/98 |
| 4,215,759 | 8/1980 | Diaz | 180/168 |
| 4,222,008 | 9/1980 | Mezrich | 328/28 |
| 4,247,896 | 1/1981 | Schnaibel | 180/168 X |
| 4,253,541 | 3/1981 | Iida et al. | 180/168 |
| 4,258,813 | 3/1981 | Rubel | 180/168 |
| 4,260,990 | 4/1981 | Lichtblau | 343/742 |
| 4,284,160 | 8/1981 | De Liban | 180/168 |
| 4,284,941 | 8/1981 | Regueiro | 318/587 |
| 4,307,329 | 12/1981 | Taylor | 318/587 |
| 4,310,789 | 1/1982 | Mank et al. | 318/587 |
| 4,322,670 | 3/1982 | Taylor | 318/587 |
| 4,333,024 | 6/1982 | Maussion | 307/351 |
| 4,361,202 | 11/1982 | Minovitch | 180/168 |
| 4,454,583 | 6/1984 | Schneiderhan et al. | 364/449 |
| 4,472,716 | 9/1984 | Hansen | 340/905 |
| 4,535,294 | 8/1985 | Ericksen et al. | 328/150 |
| 4,556,864 | 12/1985 | Roy | 340/310 A |
| 4,593,238 | 6/1986 | Yamamoto | 318/587 |
| 4,593,239 | 6/1986 | Yamamoto | 318/587 |
| 4,613,804 | 9/1986 | Swenson | 180/168 X |
| 4,613,973 | 9/1986 | Dahl | 375/37 |
| 4,630,216 | 12/1986 | Tyler et al. | 364/478 |
| 4,658,928 | 4/1987 | Seo | 180/6.5 X |
| 4,700,302 | 10/1987 | Arakawa et al. | 364/424 |
| 4,711,316 | 12/1987 | Katou et al. | 180/168 |
| 4,727,492 | 2/1988 | Reeve et al. | 364/424 |
| 4,731,867 | 3/1988 | Seabury et al. | 340/941 X |
| 4,742,283 | 5/1988 | Bolger et al. | 318/587 |
| 4,751,516 | 6/1988 | Lichtblau | 343/742 |
| 4,777,601 | 10/1988 | Boegli | 364/424.02 |
| 4,791,570 | 12/1988 | Sherman et al. | 364/436 |
| 4,800,978 | 1/1989 | Wasa et al. | 180/168 |
| 4,811,229 | 3/1989 | Wilson | 364/424.02 |
| 4,847,769 | 7/1989 | Reeve | 364/424.02 |
| 4,847,774 | 7/1989 | Tomikawa et al. | 364/424.02 |
| 4,902,948 | 2/1990 | Sherman et al. | 318/580 |
| 4,908,557 | 3/1990 | Sudare et al. | 318/587 |
| 4,939,650 | 7/1990 | Nishikawa | 364/424.02 |
| 4,939,651 | 7/1990 | Onishi | 364/424.02 |
| 5,000,279 | 3/1991 | Kondo et al. | 180/168 |

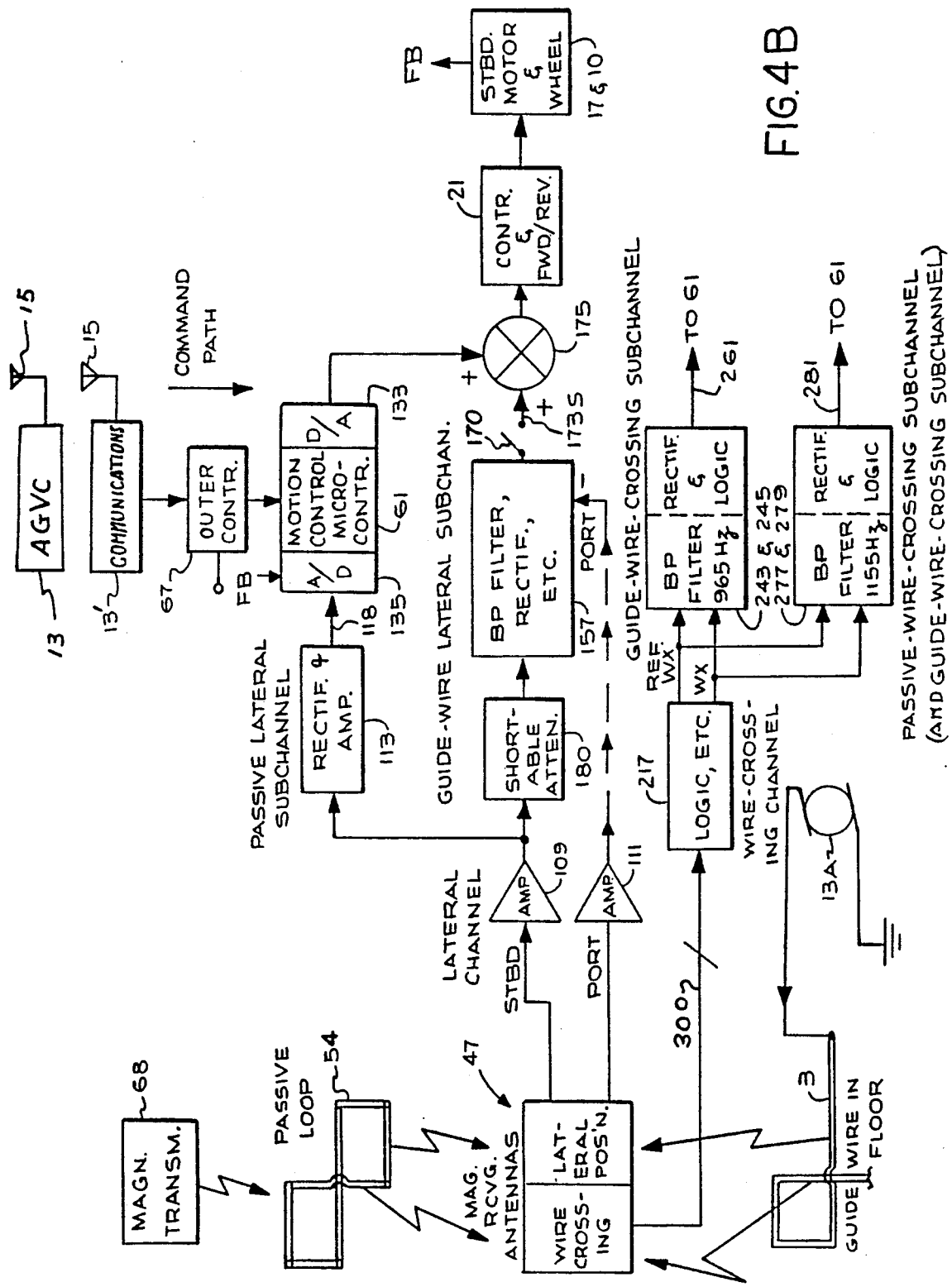

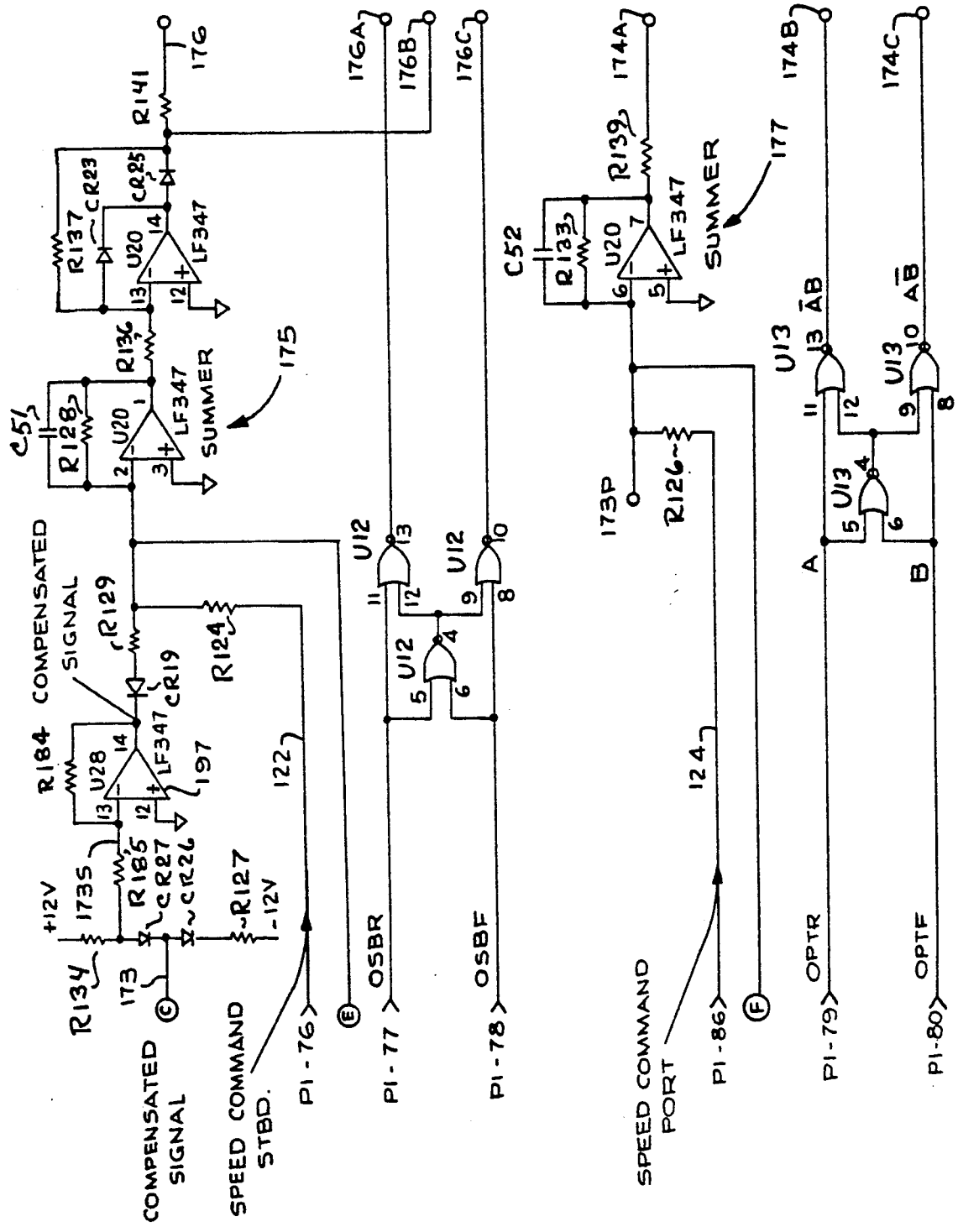

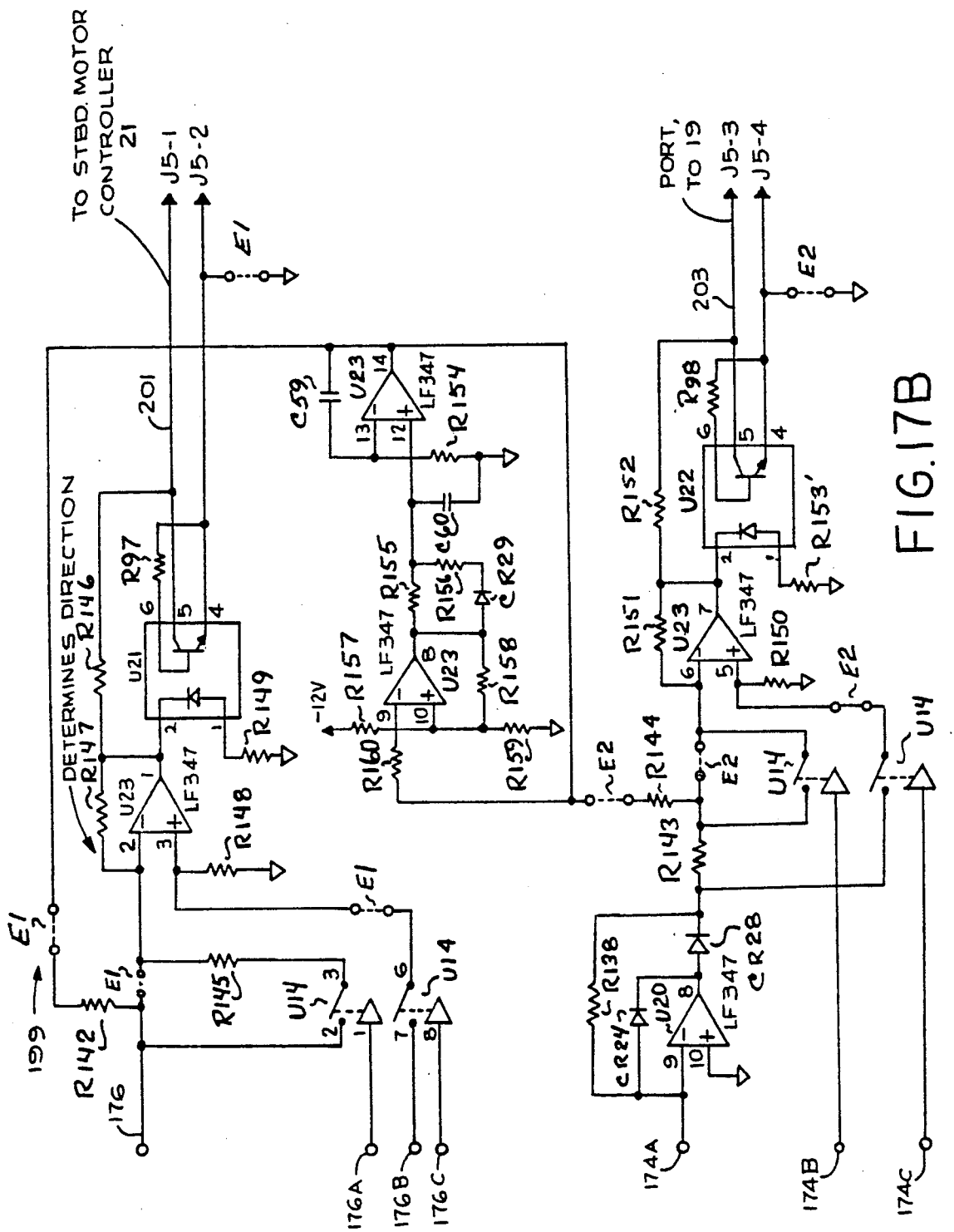

SYSTEM FOR SENSING ARRIVAL OF AN AUTOMATIC GUIDED VEHICLE AT A WIRE

FIELD OF THE INVENTION

The field of the invention is the automatic guidance of vehicles, including vehicles that navigate without a driver on board, either by self-contained navigation and guidance or by following a guidewire in the floor, and that enter into one or more terminals on their routes.

BRIEF SUMMARY AND OBJECTS OF THE INVENTION

One object of the invention is to provide apparatus for enabling an automatic guided vehicle to ascertain and control its longitudinal position rather precisely at a predetermined area on the floor, such as at a terminal.

Another object is to provide position-sensing apparatus in which only passive elements are required on (or in) the floor and all energy required for the sensing of position comes from the vehicle, at least at certain areas such as in a terminal.

Another object is to provide position-sensing apparatus in which the passive elements of equipment at the floor comprise one or more passive loops of electrical conductor.

Another object is to provide a system for positioning a vehicle in which the vehicle is automatically guided to a predetermined station or terminal by one type of guidance mode and is precisely positioned within the station by another type of guidance mode.

In a system having vehicles capable of ordinarily navigating without any guide wires in the floor between terminals and of positioning themselves accurately at terminals, an inventive object is to provide terminal-positioning apparatus of a type that enables those same vehicles to operate also in hybrid factory installations that have some guidewires in the floor; the terminal-positioning portions of the guidance apparatus are utilized for the additional purpose of following the guidewires in the floor in order to navigate between stations.

Another object is to provide vehicle terminal-positioning apparatus that enables a vehicle to operate in a hybrid installation that has active guidewires (i.e., guidewires energized by conductive connections) at the floor within some of its terminals, and that has passive loops (i.e., conductive loops energized by magnetic induction) at the floor within others of its terminals and elsewhere.

Another object is to provide apparatus to enable an automatic guided vehicle to ascertain its longitudinal position with respect to a cross-wise current-carrying conductor at the floor, by means of a plurality of magnetic sensing coils having vertical axes, and by combining the signals received from those coils in a particular and advantageous way.

BRIEF DESCRIPTION OF THE FIGURES

FIG. 4B. Simplified block diagram providing an overview of interconnections of major subsystems which operate in a terminal-positioning mode.

FIG. 17A. Circuit diagram, a continuation of FIG. 16B, of a portion of an analog board that sums a command from the motion control microprocessor with a compensated error signal, and drives a motor controller.

FIG. 17B. Circuit diagram, a continuation of FIG. 17A, of a portion of an analog board that controls direction of the vehicle (forward or reverse), and drives a motor controller.

DESCRIPTION OF PREFERRED EMBODIMENTS

Overview of an Automatic Guided Vehicle Installation

Figure 1:
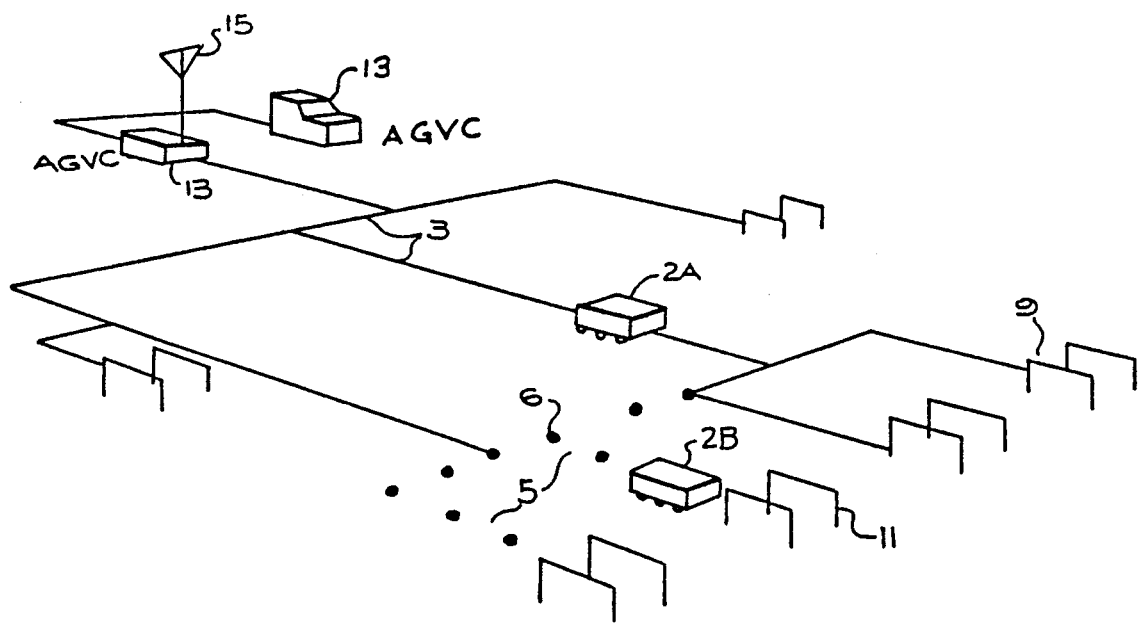
FIG. 1. Overview of an illustrative application of a preferred embodiment of the invention, including vehicular routes and some terminals for pickup and delivery.

In FIG. 1 the interior of a warehouse building is shown, in which guided vehicles 2A, 2B travel about on routes such as routes 3 and 5 among a number of terminals such as terminals 9 and 11. This is an example of a hybrid facility. The routes 3 have guide wires in the floor to define the routes and guide the vehicles; the routes 5 are traversed by self-contained navigation and guidance and radio control without guide wires in the floor, but with update magnets located at irregular intervals as much as 50 feet apart along the routes. The same vehicles are used on both types of routes.

Floor-control equipment 13, labeled AGVC, provides signals to the vehicles via guide wires embedded in the floor when they are operating on the portion 3 of the routes that have guide wires embedded in the floor. The AGVC has a transmitting antenna 15 for communicating by two-way radio with the vehicles when the vehicles are operating on portions 5 of the routes that are defined by floor magnets such as magnet 6.

Figure 2:
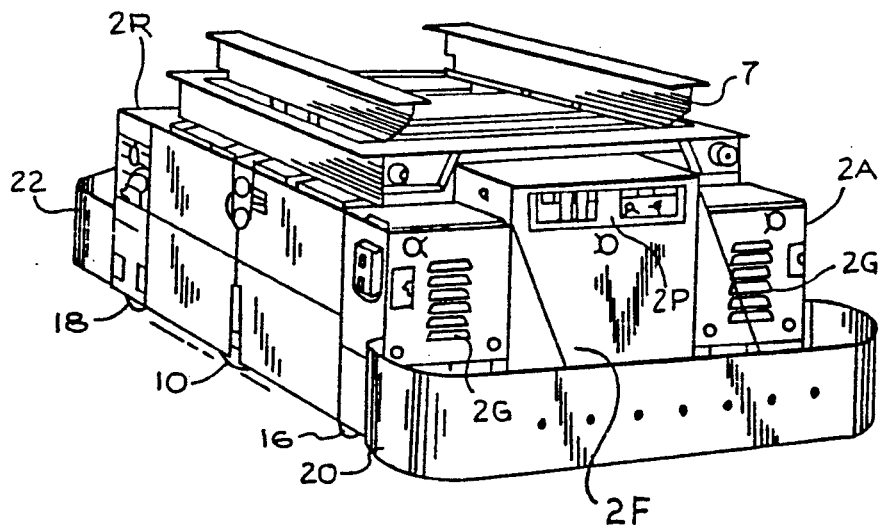
FIG. 2. Perspective view of an automatic guided vehicle.
Figure 3:
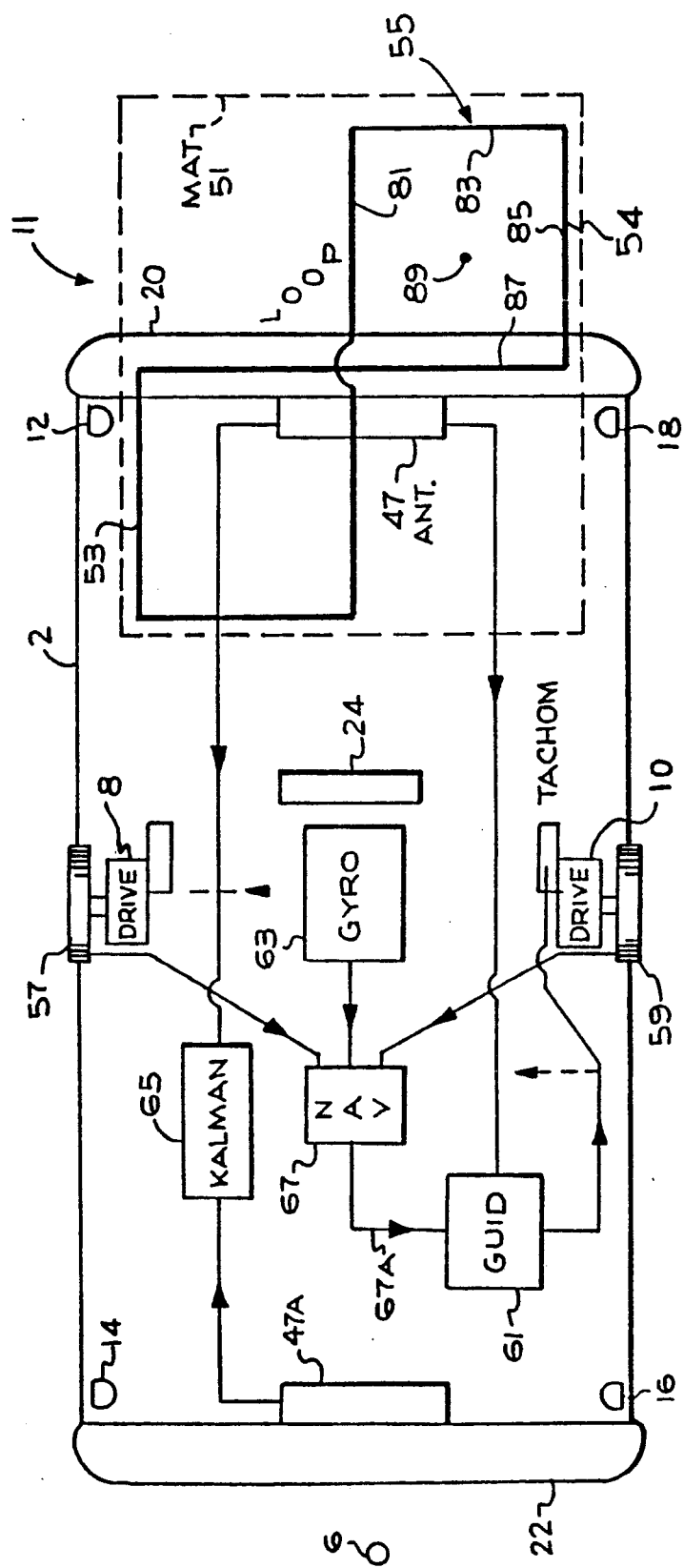
FIG. 3. Simplified top view of the vehicle and of a passive loop of conductor in a floor mat at a terminal.

One of the vehicles 2A is depicted isometrically in FIG. 2. It has drive wheels 8, 10 on its port and starboard sides respectively, which are powered individually by motors as shown in FIGS. 3 and 4. Casters 12, 14, 18 and 16 support the vehicle at its port front, port rear, starboard front and starboard rear corners respectively. The terms port, starboard, front and rear refer to physical absolutes of the vehicle. The terms left and right are relative to the direction of travel which is always termed forward; the vehicle operates symmetrically in either direction. The front 2F of vehicle 2A as seen in FIG. 2 comprises and is identified by two laterally disposed grills 2G and a control panel 2P. The rear 2R of vehicle 2A is the other end. Port and starboard are referenced to the front 2F of vehicle 2A. These terms are generally used for all vehicles.

Touch-sensitive bumpers 20, 22 are located at the front and rear of the vehicle to detect obstacles in the path and to activate switches to stop the vehicle. More information about portions of this system is given in application, Ser. No. 07/544,693, filed Jun. 27, 1990, and now abandoned, entitled "Update Marker System for Navigation of an Automatic Guided Vehicle," inventors Bryan A. Bloomfield, et al., which is assigned to the same assignee as the present application. That application is made a part of the present application by reference.

Another invention in which a guided vehicle follows passive conductors on the floor is described in U.S. Pat. No. 4,613,804, issued Sept. 23, 1986, entitled "Floor Position Sensing Apparatus and Method," invented by R. R. Swenson and assigned to the assignee of the present invention. That Patent is made a part of the present application by reference.

A simplified top view of the vehicle 2A is shown conceptually in FIG. 3. An update magnet 6 is shown on the floor on the left side of the figure. It is part of a main guidance system that can bring the vehicle to the entrance of terminal 11, for example. This is a guidance system of the type represented by the routes 5 of FIG. 1.

On the ground at the terminal 11 is a mat 51, which has a loop of wire 54 (See FIG. 5) in the shape of a skewed figure eight embedded in it. A left-hand portion or lobe of the loop is designated 53 and a right-hand portion or lobe is designated 55. An antenna system 47 is near the front of the vehicle; it is centered on a longitudinal centerline of the vehicle and extends transversely. A similar antenna system 47A is at the rear.

FIG. 3 also shows an array of Hall sensors 24 that are employed in the main guidance system of the vehicle, as well as other main guidance subsystems and components including a gyroscope 63, a navigation computer 67, an motion control processor (computer) 61 and fifth and sixth wheels 57, 59 for measuring the travel of the port and starboard sides respectively of the vehicle.

The position-sensing portion of the vehicle includes a magnetic-field transmitter on the vehicle, the passive loop of wire 54 on the floor, and signal-receiving equipment on the vehicle. During operation of the system as a whole the vehicles 2A, 2B drive about on the various segments of the routes 3, 5 as shown in FIG. 1 to pick up and deliver loads. The vehicles are propelled forward and steered by rotation of the drive wheels 8 and 10. The direction and speed of each wheel 8, 10 is controlled by its respective portion of a control system as described below with the aid of FIG. 4A.

Electronic Controls Overview

Figure 4A:
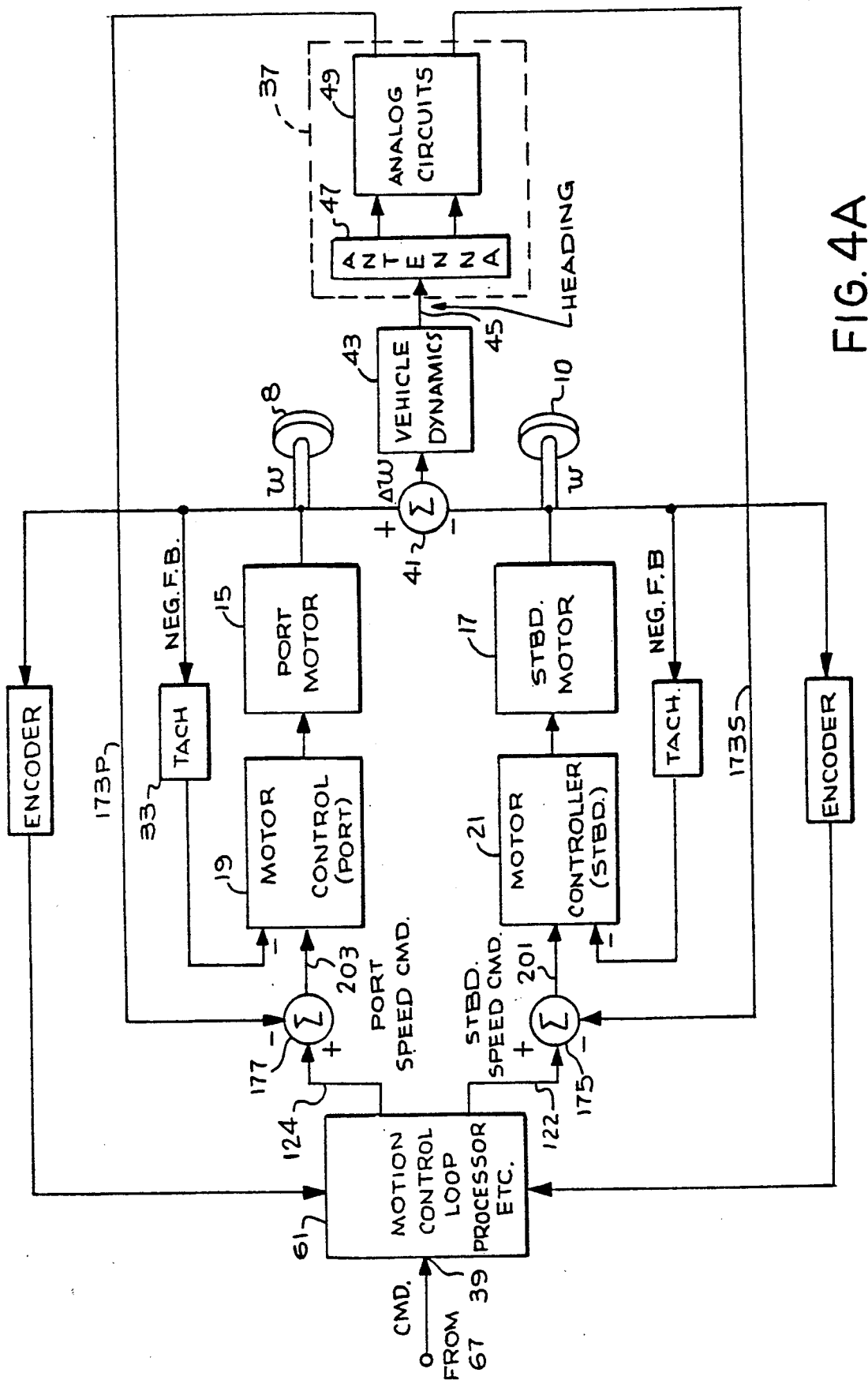
FIG. 4A. Simplified electronic block diagram of a guidance system for a vehicle which operates in both a general purpose and a terminal-positioning mode.

Various types of guidance systems could be used for controlling the vehicle when it is not in a terminal. FIG. 4A shows a "motion control processor" of a preferred control system for a vehicle. The port drive wheel 8 is driven by a port motor 15. The port motor 15 is controlled by a port motor controller 19, which receives control signals from a summing junction 177.

Inputs to the summing junction 177 include: control signals at an input 124 that come from the motion control processor 61; an input from a tachometer 33 that measures the speed of the port motor 15; and an input 173P from a terminal-positioning-mode module 37 of a vehicle navigation and guidance system, which will be described in detail below.

In a similar arrangement, a starboard motor 17 is controlled by a motor controller 21 that is driven by the output of a summing junction 175, which receives speed commands from the motion control processor 61. The summing junction 175 also receives signals from a starboard tachometer and input 173S from the terminal-positioning-mode module 37.

The motion control processor 61 receives commands at an input 39 from a self-contained navigation and guidance system.

The vehicle is driven in forward and reverse directions, relative to the front of the vehicle, and is steered in accordance with the speeds of the wheels 8, 10. The actions of the drive wheels 8, 10 affect the vehicle in a manner that is represented symbolically by a summing junction 41 and by a block 43 labeled "vehicle dynamics" on FIG. 4A.

The spacing between the wheels and other factors are represented by the block 43. Outputs of the block 43 are represented symbolically at a point 45. The outputs are the speed and heading of the vehicle as well as, when integrated, the position of the vehicle. The position of the vehicle controls the error signals as the vehicle moves about, for example, when it enters a terminal 9, 11. As shown in block 37 of FIG. 4A the terminal-positioning-mode of the vehicle navigation and guidance system includes the antenna assembly 47 and an analog circuit block 49, both of which will be described in detail.

Commands for control of the vehicle are at terminal 39 on the left side of FIG. 4A. Commands and feedback signals such as 173P and 173S are conducted through the summing junctions 177, 175 to the port motor controller 19 and the starboard motor controller 21 respectively. They drive the port motor 15 and the starboard motor 17 respectively, which drive the port and starboard wheels 8, 10 respectively.

Figure 4C:
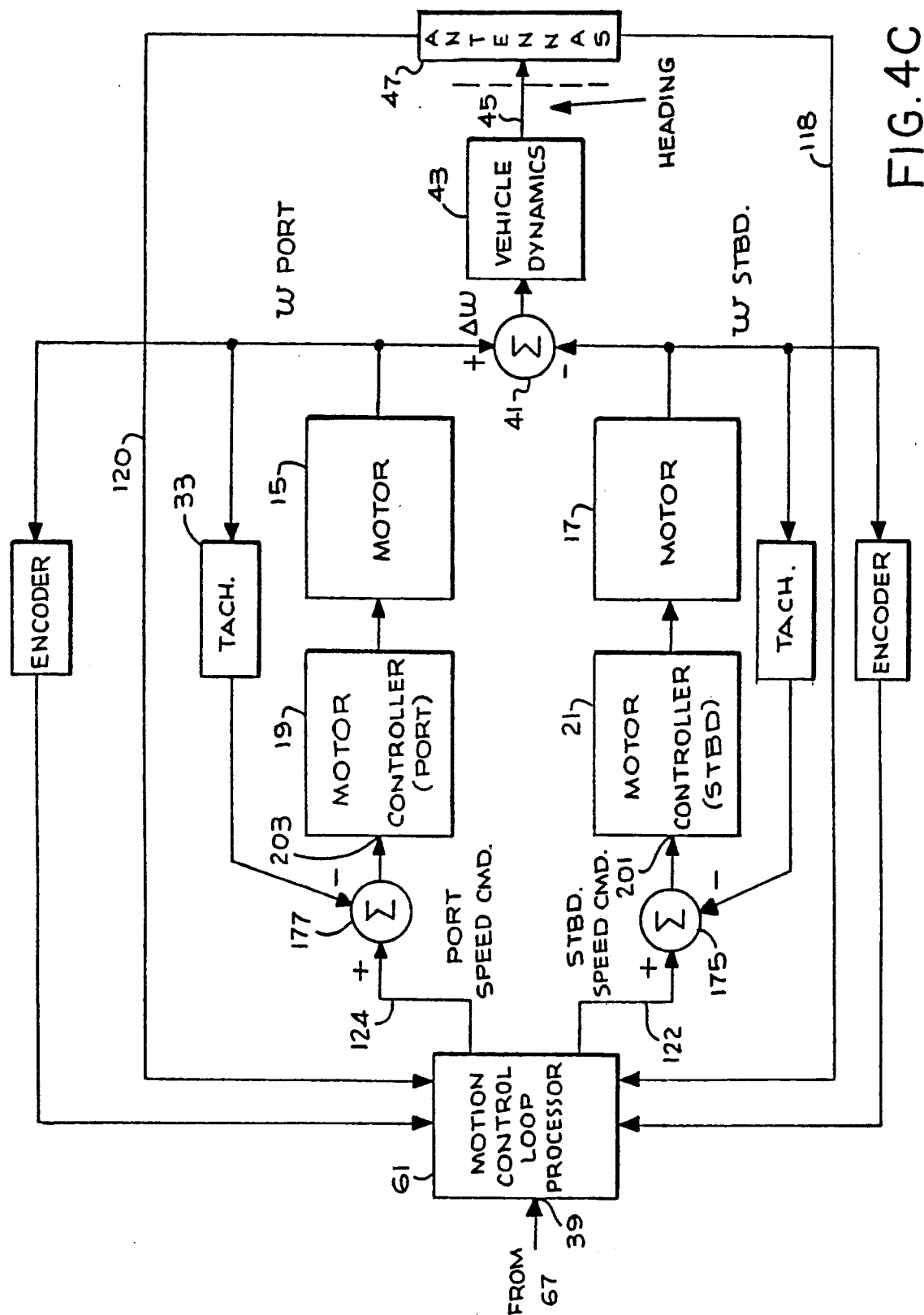
FIG. 4C. Simplified electronic block diagram similar to FIG. 4A, but showing only elements that are used when the apparatus is in the terminal positioning mode of operation and omitting other elements.

When the vehicle 2A enters a terminal having a passive loop floor mat 51, it comes principally under the control of the terminal-positioning mode of the vehicle navigation and guidance system, etc. This system produces signals at terminals 118, 120 that are input to the motion control processor as seen in FIG. 4C.

When a vehicle with an incorrect lateral position (e.g., with an offset from the centerline of the terminal), enters a terminal an error signal is generated by the terminal-positioning mode of the vehicle navigation and guidance system. The signals at lines 118, 120, in combination, produce an error signal which has such polarity (see also FIG. 12B) as to operate the motors 15, 17 to steer the vehicle in a direction to correct the error of position. Antenna output signal conditioning circuits similar to those seen in FIG. 12B for front-end antenna signal conditioning, not shown, are located at the rear-end of the vehicle but are of opposite hand.

When the vehicle has proceeded longitudinally to where a wire-cross exists, another signal, on line 300 of FIG. 4B, notifies the outer loop processor 67, which takes appropriate action of altering speed commands. The antenna assembly 47 of FIG. 4B includes antennas that are receptive to the transverse wire-crossing portion 87 of the loop 54, as will be described in more detail below in sections relating to wire-crossing positioning of the vehicle. The longitudinal position of the vehicle is controlled by the motor controllers 19 and 21, which operate the motors 15, 17 so as to move the vehicle forward and back as necessary to position it over the wire-crossing portion 87 of the passive loop of mat 51, etc.

Overview of Interconnections of Major Subsystems

FIG. 4B is a simplified diagram showing the relationships between major subsystems of the terminal-positioning mode of the vehicle navigation and guidance system.

Commands from the AGVC 13, which stores map-like route and vehicle-location information, by wireless transmission to communications block 13' go to an outer loop microcontroller 67 whose outputs go to a motion control microcontroller 61. They then pass through a D/A converter 133 to a summing junction 175. The output of summing junction 175 goes to a controller 21 and forward/reverse block, which drives the starboard motor 17 and wheel 10. Only the starboard circuits are being described.

As the vehicle moves about to carry out the commands that it receives, feedback signals responsive to its position are generated. They are processed and entered into the control system through several channels. As shown on FIG. 4B, these channels include a Passive Lateral Subchannel at terminal 118, a Guide-Wire Lateral Subchannel at terminal 173S, a Guide-Wire-Crossing Subchannel 261 and a Passive-Wire-Crossing Subchannel 281. The channels are described briefly here to show their relationships, and in much greater detail in subsequent sections.

A magnetic transmitter 68 couples magnetic energy to a passive loop 54 on the floor in a terminal. Induced current in the passive loop 54 produces magnetic fields that are sensed by a receiving antenna system 47. The receiving antenna system 47 comprises separate magnetic receiving antennas for lateral positioning of the vehicle and for wire-crossing positioning of the vehicle.

Instead of being energized by the magnetic transmitter 68, the magnetic receiving antennas 47 can, alternatively, be energized by magnetic fields produced by a wire 3 in the floor, as shown on FIG. 4B. The wire 3 in the floor is energized by the AGVC 13, which is represented on FIG. 4B for drafting convenience by an AC generator 13A.

Output from the lateral-positioning system's antennas are connected to a right Lateral Channel 109, which will be described in more detail, and to a left Lateral Channel which will not be described because it is the same as the right Lateral Channel.

The right Lateral Channel divides into a Passive Lateral Subchannel, including rectifier 113 and an amplifier. The Passive Lateral Subchannel connects through an A/D converter 135 to the motion control processor 61, where it joins the command signals. Signals then pass through the D/A converter 133 and are input to the summing junction 175.

FIG. 4C is a simplified version of FIG. 4A. It is a functional block diagram showing elements that are in use when the equipment is in the terminal-positioning mode of operation. The Passive Lateral Subchannel components, which are used in the Terminal-positioning mode of operation are shown. The analog circuits 49 are not shown in FIG. 4C because they are effectively by-passed when the terminal-positioning mode is operating.

The right Lateral Channel 109 also goes to a Guide-Wire Lateral Subchannel, which starts at a shortable attenuator 180. (Most of a corresponding left portion of the channel, starting at 111, is omitted from FIG. 4B.) The right Lateral Channel then goes to a bandpass filter 157 and other signal-processing elements. It is switchable by a switch 170 (controlled by outer controller 67) before terminal 173S to allow input to the summing junction 175 when guiding over a guide wire 3 in the floor, and to prevent interference from signal at 173S when guiding over a passive wire 54 in the floor.

The wire-crossing receiving antennas are connected to a Wire-Crossing Channel at logic circuits 217, etc. These circuits produce a wire-crossing signal WX and a wire-crossing reference signal REFWX, both of which are connected to two subchannels.

The first of the two wire-crossing subchannels is a Passive-Wire-Crossing Subchannel that starts with 1155-Hz band-pass filters 277 and 279. Its signal proceeds through rectifier and logic circuits to an output terminal 281. Terminal 281 is connected to the outer loop microcontroller 67, completing a positioning-feedback loop.

The other subchannel to which the Wire-Crossing-Channel is connected is the Guide-Wire Crossing Subchannel of FIG. 4B. It starts with 965-Hz bandpass filters 243 and 245. The signals proceed through rectifiers and logic circuitry to terminal 261. From there the feedback signals are connected to the outer loop microcontroller 67, where they join the command signals from the AGVC 13, to complete a positioning-feedback loop.

When a vehicle is in a terminal that has a passive loop 54 on the floor, lateral positioning is accomplished by means of the Lateral Channel and the Passive Lateral Subchannel. Longitudinal positioning is accomplished through the Wire-Crossing Channel and the Passive-Wire-Crossing Subchannel.

When a vehicle is in a terminal having an active guide wire in the floor, lateral positioning of the vehicle is accomplished through the Lateral Channel and the Guide-Wire Lateral Subchannel. Longitudinal positioning is accomplished by means of the Wire-Crossing Channel and the Guide-Wire-Crossing Subchannel.

When a vehicle is not in a terminal and is on a route, such as route 5, that has only update magnets, guidance is accomplished by self-contained navigation and guidance.

When a vehicle is not in a terminal and is on a route, such as route 3, in which there are actively energized guide-wires in the floor, lateral positioning is accomplished by means of the Lateral Channel and the Guide-Wire Lateral Subchannel. Longitudinal positioning can be accomplished between terminals where there is a wire crossing by means of the Wire-Crossing Channel and the Guide-Wire-Crossing Subchannel.

Magnetic Fields Transmitter

Figure 5:
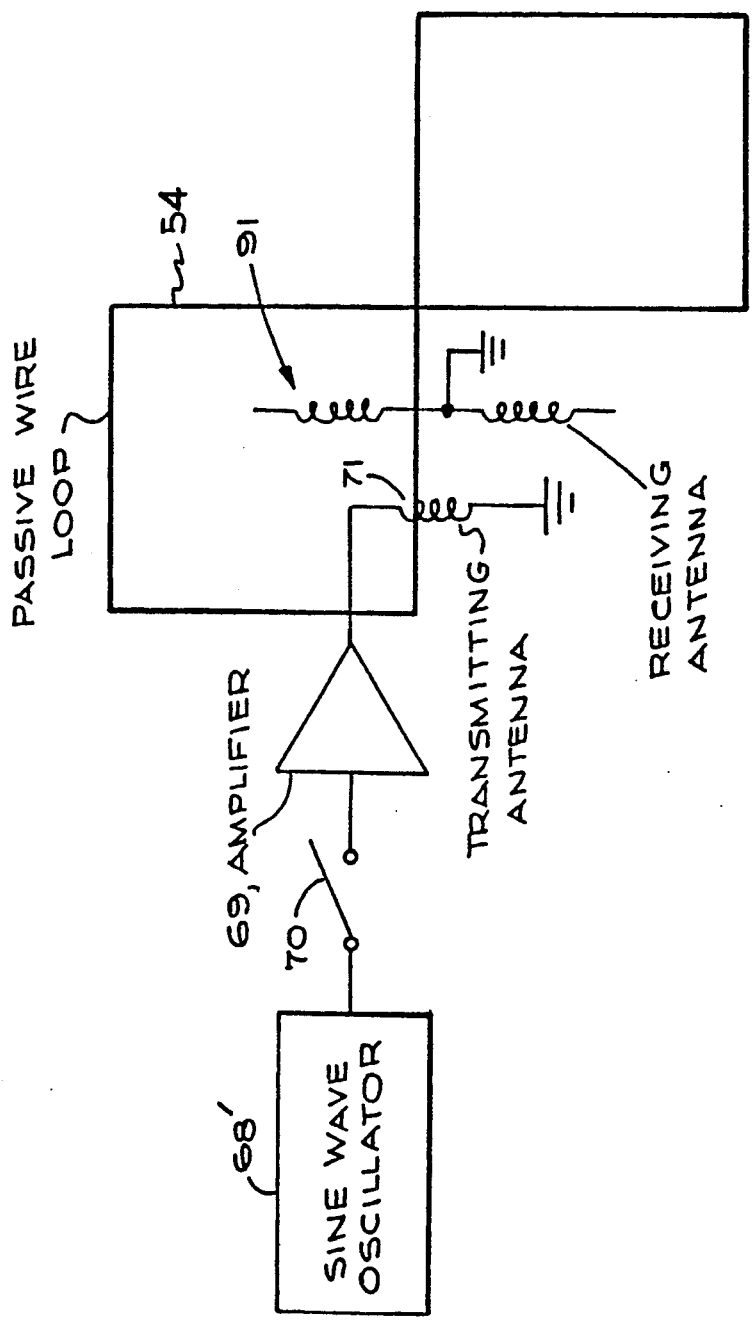
FIG. 5. Simplified block diagram of certain components of a vehicle navigation and guidance system on a vehicle for transmitting a magnetic field when operating in the terminal-positioning mode.

The subsystem 37 of FIG. 4A includes a magnetic field transmitter that is shown in simplified form in FIG. 5. A sinusoidal waveform oscillator 68' on the vehicle is connected through a switch 70 and an amplifier 69 to a transmitting antenna 71 to provide a magnetic field signal of frequency 1, 155 Hz. The transmitting antenna 71 is part of the antenna assembly 47 shown on FIGS. 3 and 4A.

Figure 6:
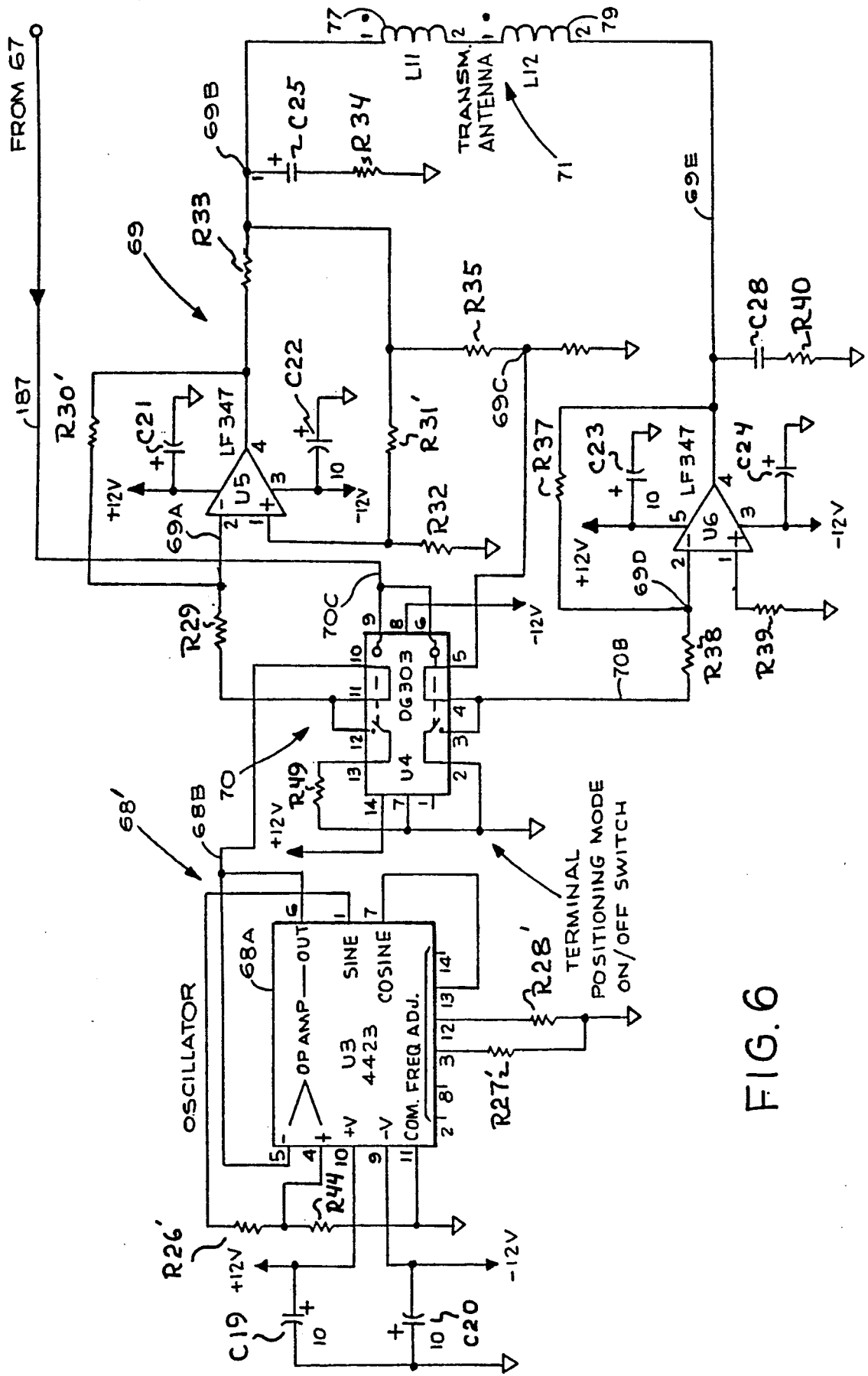
FIG. 6. Circuit diagram of an oscillator, switch, driver, and transmitting antenna of FIG. 5, which are transmitter portions of the preferred vehicle navigation system when operating in the terminal-positioning mode.

The transmitter is shown in more detail in FIG. 6. The main component of its oscillator 68' is a conventional commercially available chip 68A. Its output at terminal 68B is connected to the analog on-off switch 70. When the switch is in a conductive condition the oscillator's signal is connected to input 69A of one side of a push-pull current driver amplifier 69.

The output at 69B of one amplifier 69 is connected through a resistor to a point 69C, which is connected to another pole of the analog switch 70. The output of that pole at 70B is connected to an inverting input 69D of another side of the push-pull driver amplifier 69. The output of that other side is at a terminal 69E.

The output terminals 69B, 69E of the push-pull drivers 69 are connected to two series-connected coils 77, 79 of the transmitting antenna 71, as shown in FIG. 6.

The analog on-off switch 70 is operated by a signal at a terminal 70C, which comes from the outer loop microprocessor 67. The transmitter system comprising elements 68', 69, 70 and 71 is turned off by operation of the switch 70 when the vehicle is being operated in a mode in which it follows an actively energized guide wire. The outer loop processor receives information from the AGVC 13, which keeps track of whether or not the vehicle is approaching or in a terminal.

Figure 7:
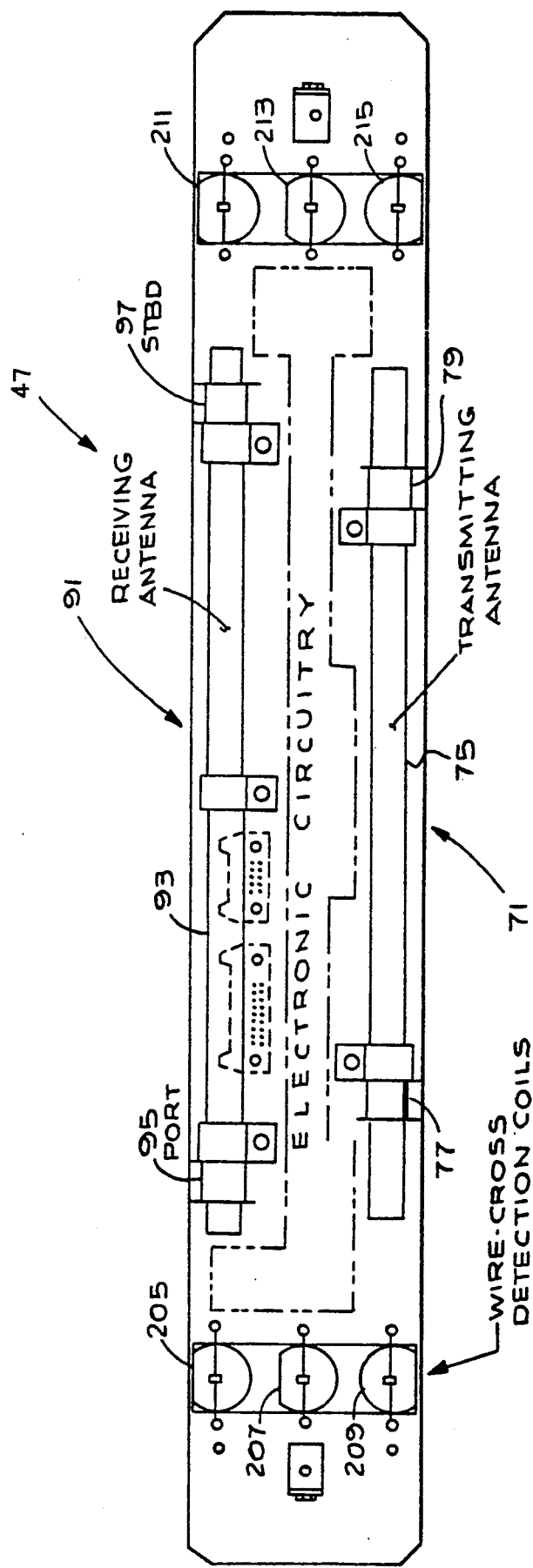
FIG. 7. A circuit board layout showing antennas for lateral and wire-cross positioning operations.

As shown in FIG. 7, the transmitting antenna 71 includes a ferrite rod 75 that serves as a core for the antenna. The relative magnetic permeability of the ferrite rod is about 2000. Mounted on the core 75 near its ends are a left-side coil of wire 77 and a right-side coil 79. The push-pull drivers 69 are connected to the coils 77, 79 with such polarity that the coils produce reinforcing magnetomotive force (of the same phase) in the ferrite rod 75.

The lateral position of the transmitting antenna 71 relative to the center 81 of the floor loop assembly 54 has very little effect on the amount of current induced in the passive loop 54 within a wide lateral range between the transmitting coils 77, 79 because the amount of magnetic flux linking the loop 54 does not change appreciably within that range. The electric current induced in the loop 54 is, however, inversely dependent upon the vertical and longitudinal distance between the transmitting antenna 71 and the central wire portion 81 of the loop 54.

The operation of the transmitter is as follows: The oscillator 68' produces a signal which can be connected through the analog on-off switch 70 to the push-pull drivers 69. The output signal from the push-pull drivers 69 energizes the transmitting antenna 71.

The transmitting antenna produces a magnetic field that extends downward to encircle the wire element 81 of the loop 54 (or any wire that is within the range of the transmitting antenna, e.g., a guide wire in the floor). In the case of a loop such as loop 54, the AC magnetic field produced by the antenna 71 induces a current in the wire segment 81, and that current produces a magnetic field surrounding the wire segments 81, 87, etc. of the loop 54.

Receiving Antennas and Their Magnetic Coupling with Wires on Floor

FIG. 7 also shows a receiving antenna assembly 91. It detects magnetic fields produced by currents in wires on the floor. In this preferred embodiment, a single ferrite rod core 93 is used, with one receiving coil 95 mounted near the left end of the rod and another receiving coil 97 mounted near the right end of the rod 93.

Alternatively, two shorter ferrite rods can be employed with a fixed lateral space between them, each encircled by only one of the two receiving coils 95, 97.

In this embodiment the receiving antenna assembly 91 is mounted parallel to and close to the transmitting antenna 71. The signal that the receiving antenna assembly 91 receives has two components: (a) a signal from either the passive loop of wire 54 or a guide wire in the floor and (b) a direct signal from the transmitting antenna 71 if it is on. Because the position of the transmitting antenna 71 is fixed in relation to the receiving antenna 91 the undesired direct signal component is relatively constant, so it can be deducted.

Referring now to the component of signal received from the wires in the floor such as the wire 81 of the loop 54, the current in each coil 95, 97 of the receiving antenna assembly 91 depends upon the nearness of the receiving antenna 91 as a whole to the plastic floor mat 51 and upon the lateral displacement of the receiving antenna 91 from the center wire segment 81 of the passive loop 54.

Figure 8:
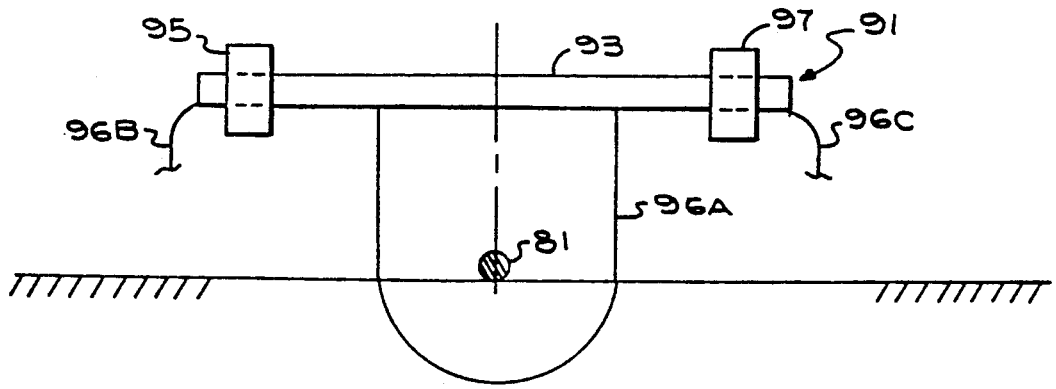
FIG. 8. Vertical sectional view of a conductor on the floor and a receiving antenna assembly on a vehicle that is centered above it.
Figure 9:
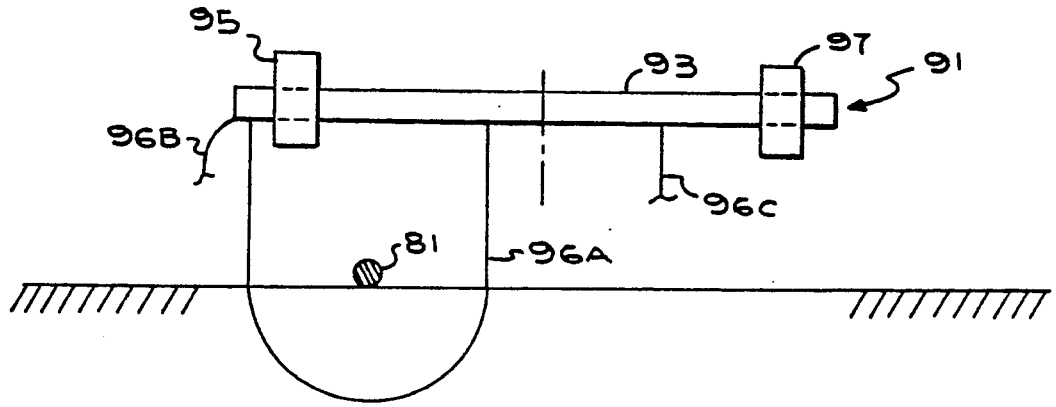
FIG. 9. Another vertical sectional view of a conductor on the floor and a receiving antenna assembly that is offset laterally above it.

The relationship between received signals and lateral displacement is relatively linear for the central 90% of the lateral distance between the two receiving coils 95, 97, FIG. 7. The ferrite rod 97 helps to provide this linearity. FIGS. 8 and 9 illustrate the manner in which magnetic flux produced by electric current in the wire 81 (FIG. 3) enters the ferrite receiving rod 93 and links the coils 95, 97. In order to facilitate the explanation, FIGS. 8 and 9 are not drawn to scale.

In FIG. 8 the receiving antenna 91 is centered laterally over the current-carrying conductor 81, while in FIG. 9 the antenna 91 is offset laterally from the conductor 81. The direction of lines of magnetic flux is shown by a stylized line sketch 96A in FIG. 8. Other lines of flux 96B, 96C of course enter the ferrite rod at its left- and right-hand ends, and hence encircle the turns of the coils 95, 97. The current-carrying conductor can represent several turns of wire in some embodiments.

In FIG. 9 the flux line 96A encircles the coil 95, because of the offset position of the antenna 91. The flux line 96B still enters the left end of the rod 93 and encircles the coil 95. When the vehicle is offset, the partially shown flux line 96C no longer encircles the right coil 97. This arrangement, in which a single ferrite rod is used for both receiving coils, has been found to improve the linearity of the induced signal in the receiving system as a function of the offset of the vehicle from the current-carrying conductor 81.

Figure 10A:
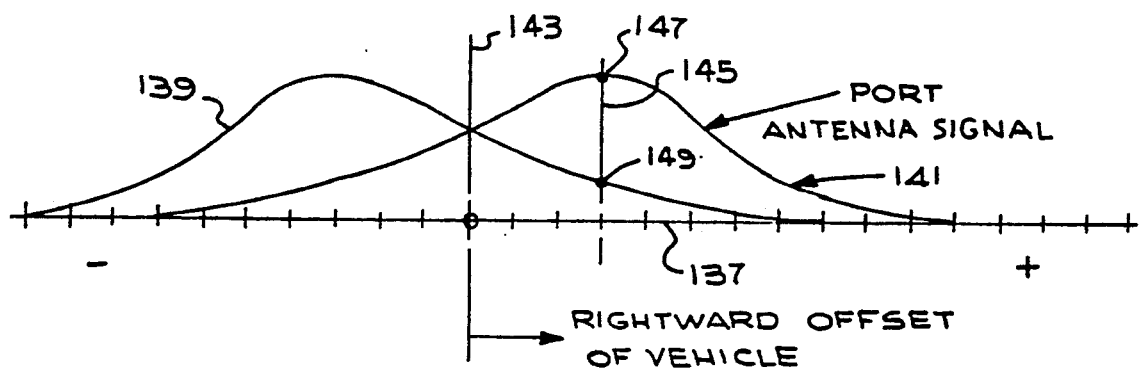
FIG. 10A. Graph of amplitudes of signals received at magnetic receiving antennas on the vehicle as a function of the vehicle's lateral location relative to a current carrying wire (such as a part of a conductive loop) on the floor.

A graph of the amplitudes of signals induced in the receiving antenna coils 95, 97 is shown in FIG. 10A. The abscissa 137 represents the lateral offset of the vehicle from the longitudinal centerline of the terminal 11. The ordinate 143 of the graph of FIG. 10A represents signal strength at the coils 95, 97.

In particular the starboard receiving antenna coil 97 produces a signal shown by a curve 139, and the left antenna receiving coil produces a signal shown by a curve 141. When the vehicle is exactly in the position defined by the programmed lateral offset and represented by the vertical line 143 of FIG. 10A, the signals 139 and 141 cause the wheels 8, 10 to rotate at equal speeds.

For example, when the lateral offset is zero and when the vehicle comprises an offset such as at the vertical line 145, the left antenna 95 receives a much stronger signal, as indicated by a point 147 on the curve 141, than does the right antenna coil 97, as indicated by the weaker signal at a point 149 of the curve 139. The result is that the left wheel 8 is then driven slower than the right wheel 10 and the vehicle's position is corrected to center the vehicle over the guide wire as it moves forward into the terminal 11 or, alternatively, along a guide wire in the floor in the terminal 9.

Figure 10B:
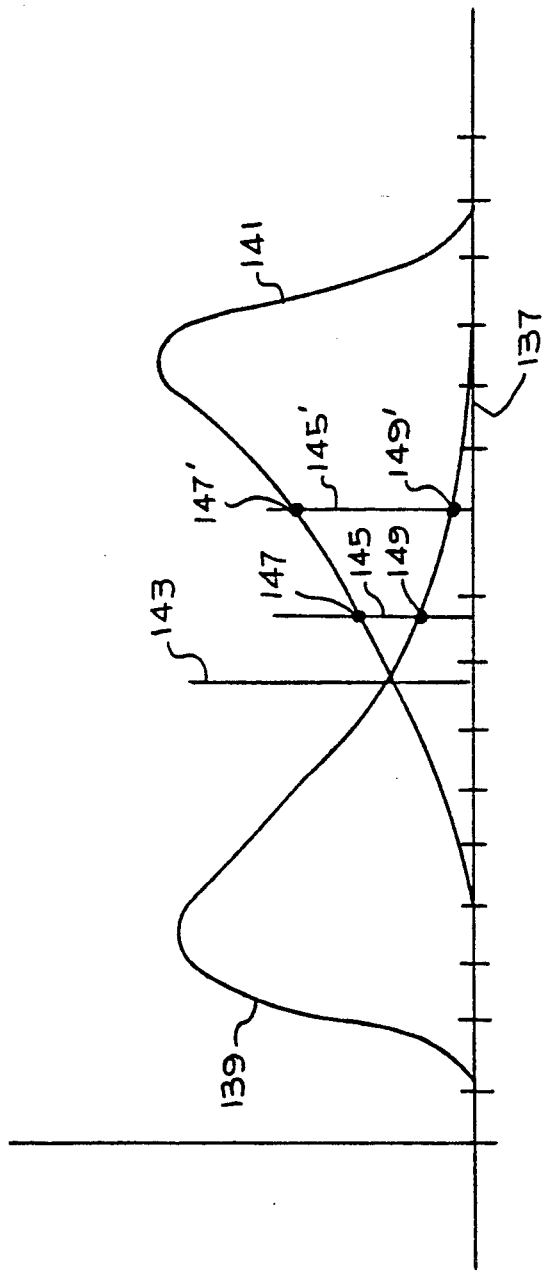

From time to time, it may be desirable to drive the vehicle with an offset lateral to a guide wire. This is accomplished under program control by the motion control processor 61 wherein a lateral offset bias is digitally added to one of the signals over terminals 118, 120, after digitization. As seen in FIG. 10B, which comprises the same axes and curves seen in FIG. 10A, a desired offset 145' away from center line 143 establishes two curve 139 and 141 intersections, 149' and 147', respectively. The lateral offset bias is calculated as the difference between the values at intersections 149' and 147' and comprises a sign opposite the sign of an offset error which occurs on the same side of center line 143.

Figure 13:
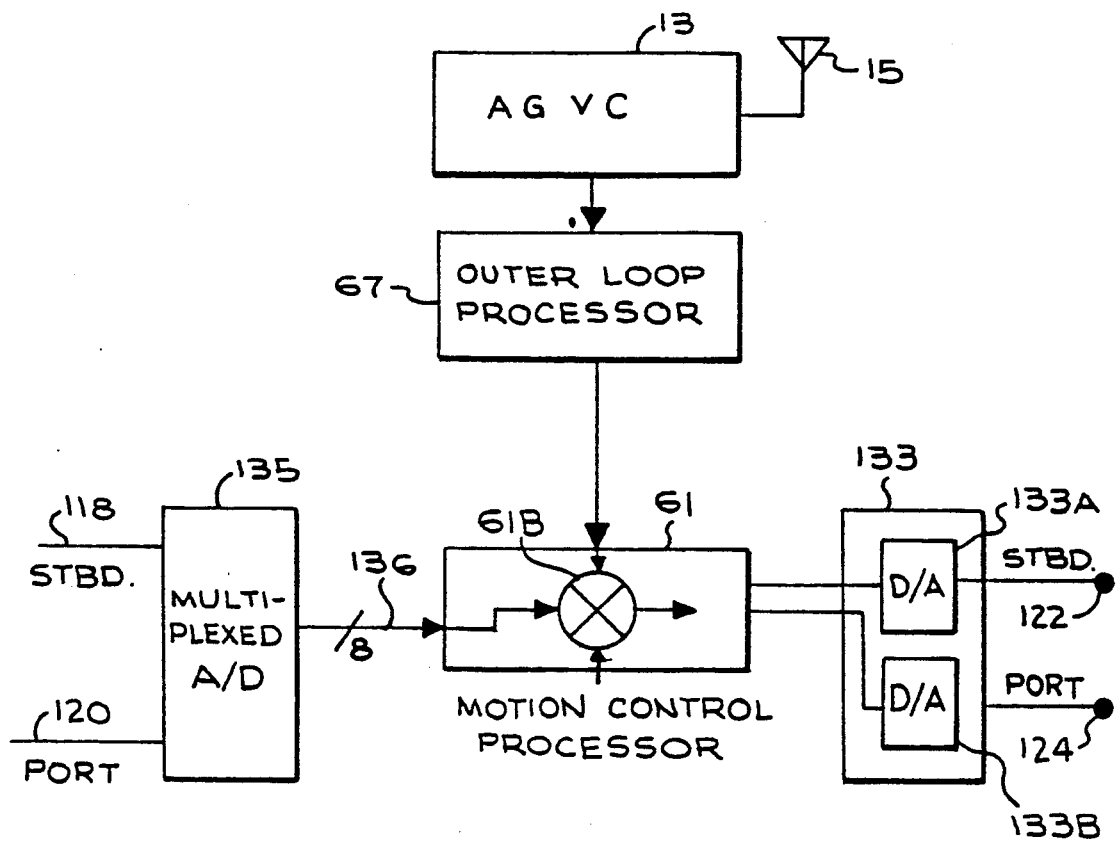
FIG. 13. Block diagram showing an automatic guided vehicle controller (AGVC), microprocessors, and some equipment for operation in a passive wire loop mode.

Hybridity of Self-Contained Navigation-and-Guidance and Proportional-Positioning System Figures relating to hybridity include FIGS. 4 and 13. The vehicle navigation and guidance system, in the self-contained mode, operates by starting with a known position and heading and measuring the distances traveled by both the left and right sides of the vehicle. It integrates those distances to keep track of the location of the vehicle. The position is updated periodically by detecting a magnet of known position such as magnet 6 in the floor over which the vehicle travels.

The AGVC 13 keeps track of the status and position of each vehicle. The AGVC 13 has terminal information and a map of the path layout stored in memory. When a vehicle is directed to a terminal, such as terminal 11, that has a passive floor loop 54 and not an active guide wire, the AGVC 13 tells the outer loop processor 67 to guide in the terminal-positioning mode of the vehicle navigation and guidance system. Commands and other signals pass between computer 67 and computer 61 on a line 67A of FIG. 3. The outer loop guidance microcontroller 67 then sends a control signal on a line 187 (FIGS. 6 and 15) to a switch 70 that energizes the transmitting antenna 71. It also sends a control signal to another switch 185 that causes attenuation of the guide-wire-signal channel (terminals 153 and 155) of FIG. 15 (and FIGS. 14, 16A).

Figure 16A:
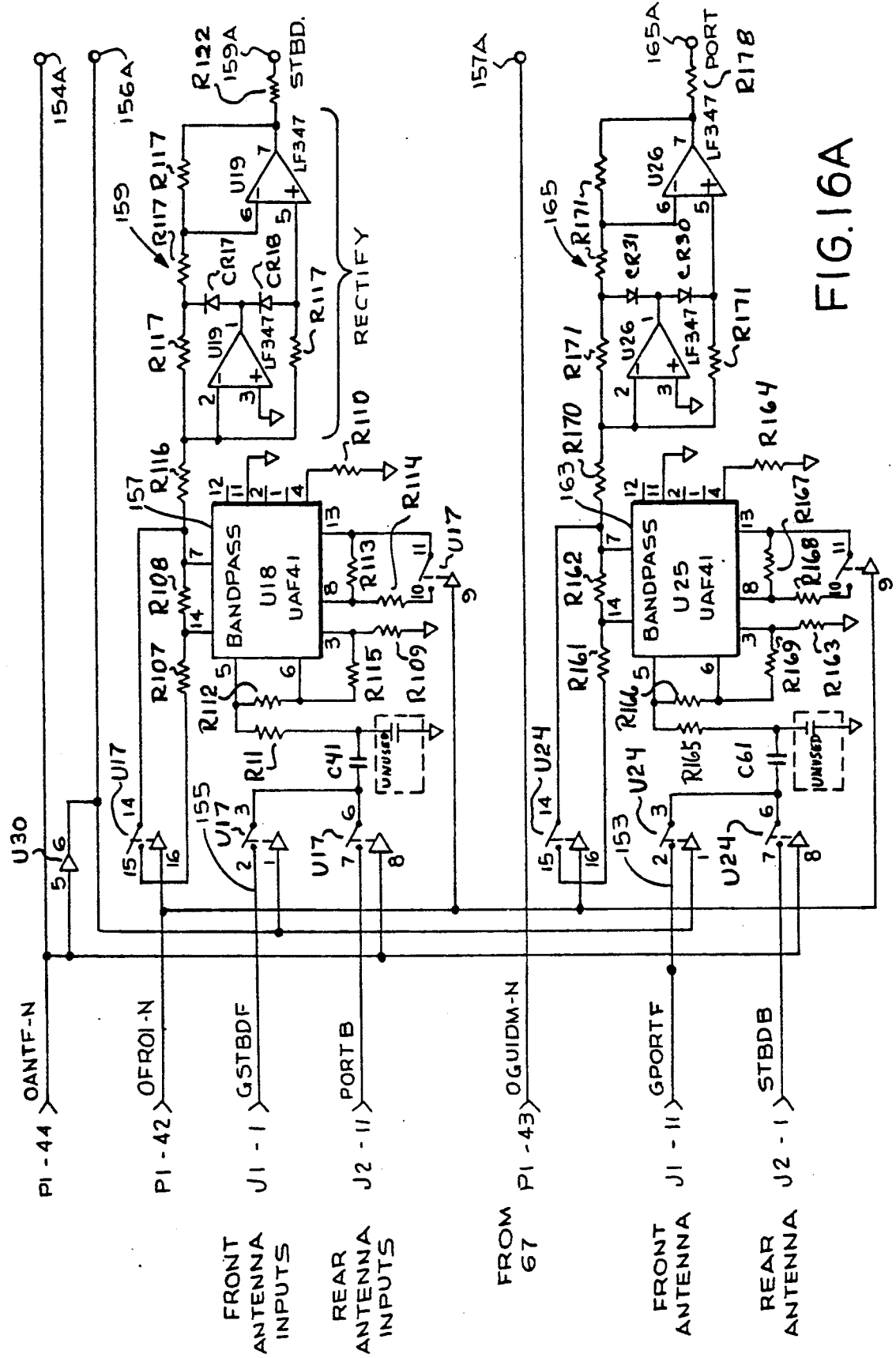
FIG. 16A. Circuit diagram of a bandpass-filtering and signal-rectifying portion of the equipment for a guide-wire-tracking mode of operation (middle portion of circuit).
Figure 16B:
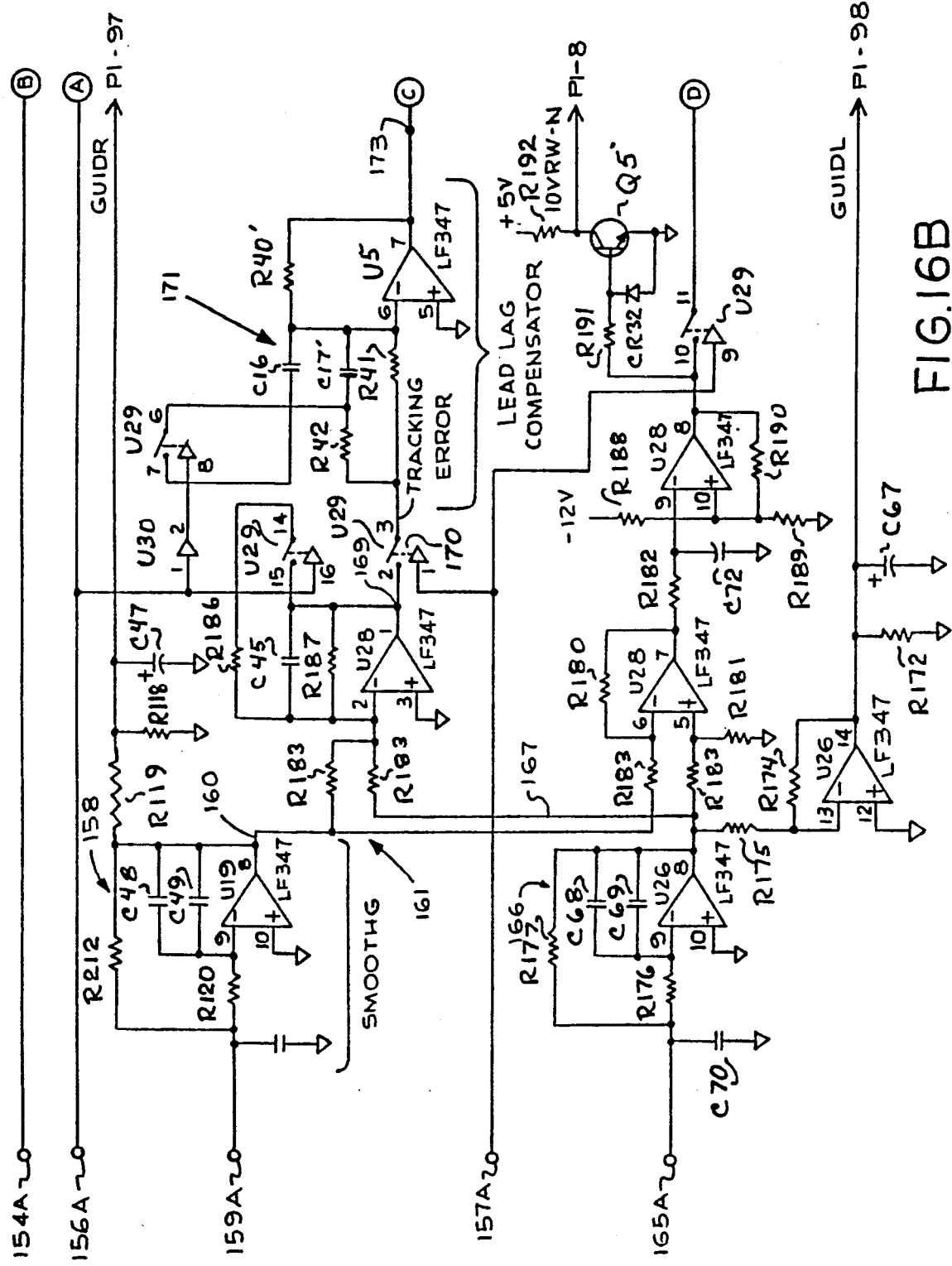
FIG. 16B. Circuit diagram, a continuation of FIG. 16A, of a smoothing and compensator portion of the equipment for a guide-wire-tracking mode of operation.

The active guide-wire-signal channel's error signal at terminal 169 of FIG. 16B is switched off so that it does not interface with the passive wire loop's signal at terminals 122 and 124. This insures that the passive wire loop's signal (FIGS. 12 and 13) completely controls the vehicle. More detailed descriptions of the circuits involved are presented below.

Lateral Positioning of a Vehicle at a Terminal Having a Passive Floor Loop

Figure 11:
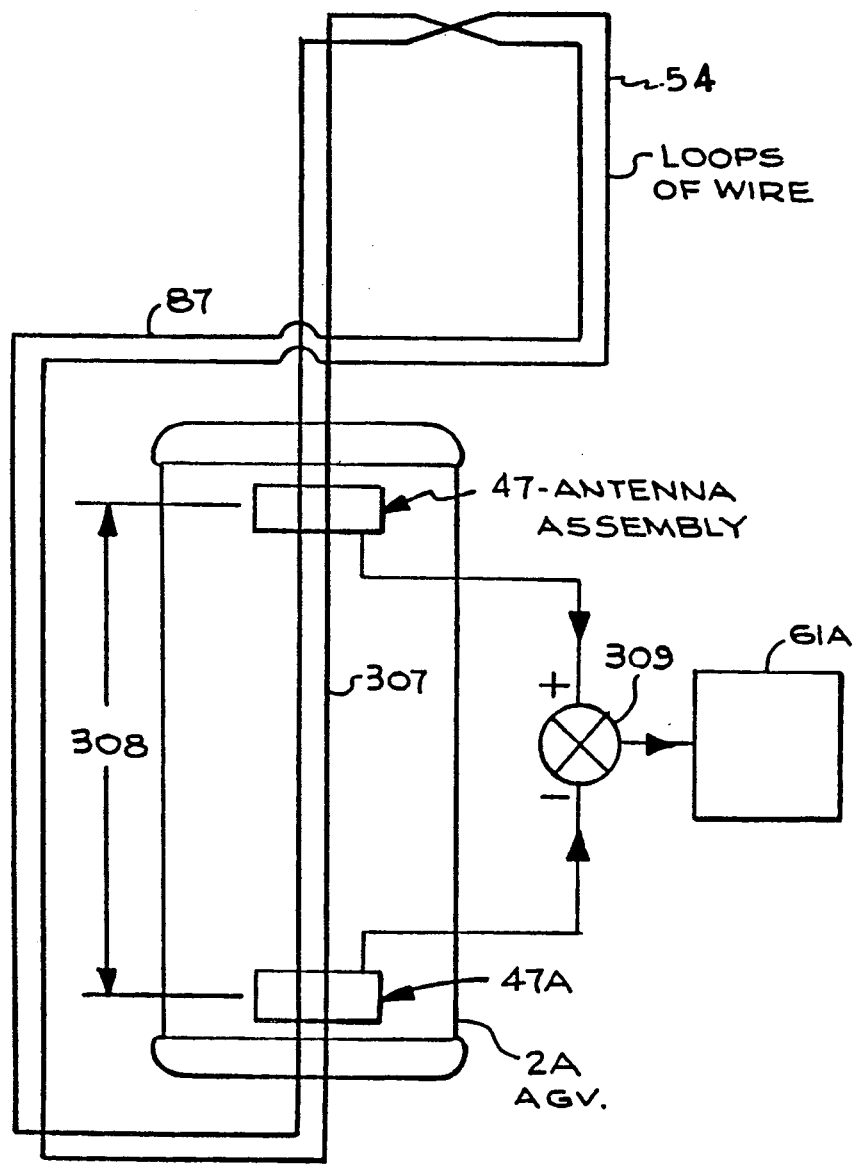
FIG. 11. Plan view of an alternative configuration of antennas and a passive loop arrangement having two turns.

FIG. 11 shows a conductive loop that is short-circuited to itself and doubled over so that it has two turns. One, two or any other convenient number of turns can be used. If preferred, separate superimposed shorted loops could of course be used instead. They are folded to form the skewed FIG. 8 of FIG. 11 in order to produce a wire cross at any desired position. Loops can of course be used for precise positioning of vehicles at places other than terminals if desired.

The location of an automatic guided vehicle 2A is shown and its antenna assembly 47 is indicated on the vehicle. The longitudinal conductors are designated by the reference number 81 and the transverse or cross wires are designated 87.

Figure 12A:
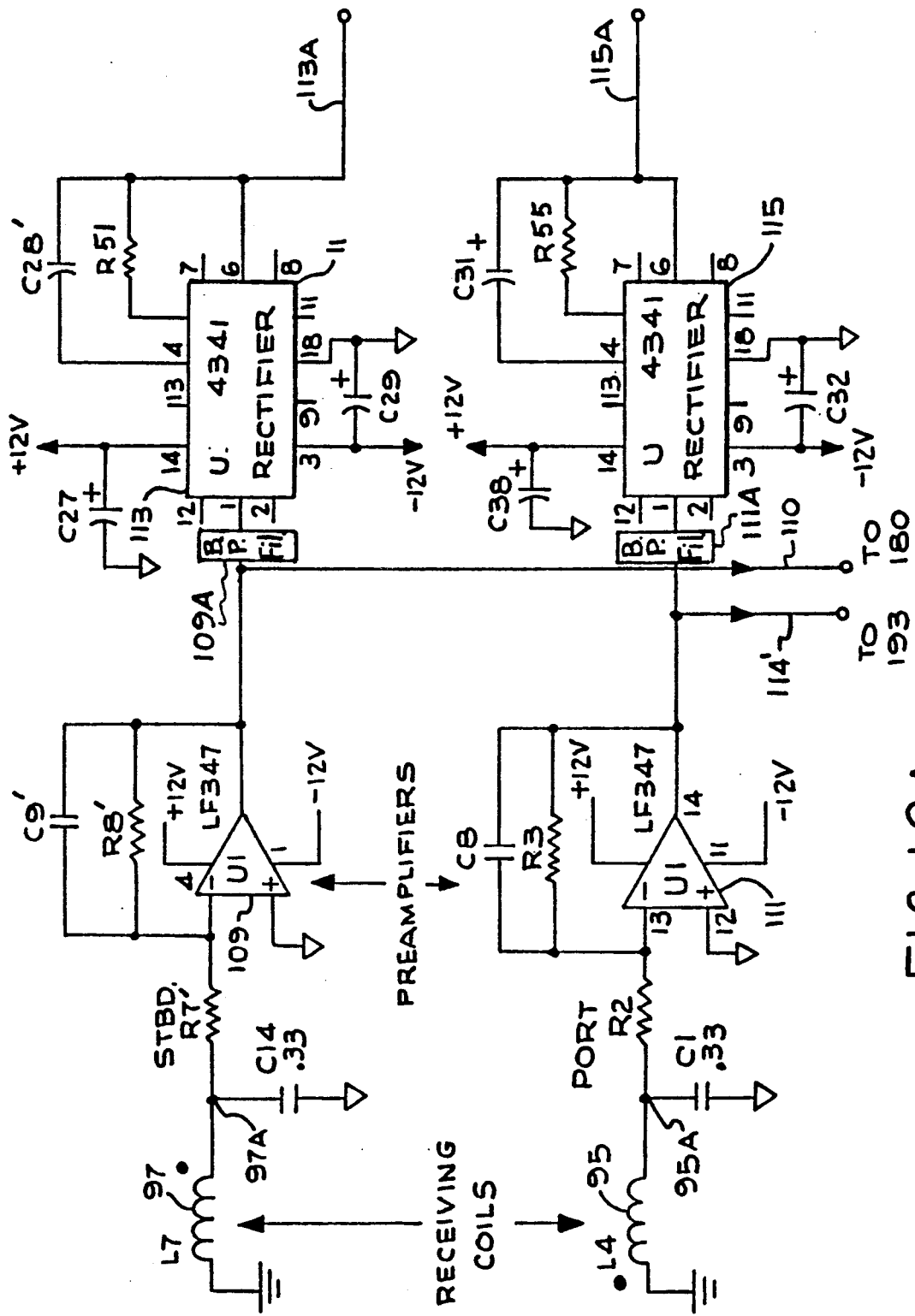
FIG. 12A. Circuit diagram of receiving antennas, preamplifiers used in common by several circuits. Also shown are rectifiers for terminal-positioning operation in which only a passive loop of wire is on the floor.
Figure 12B:
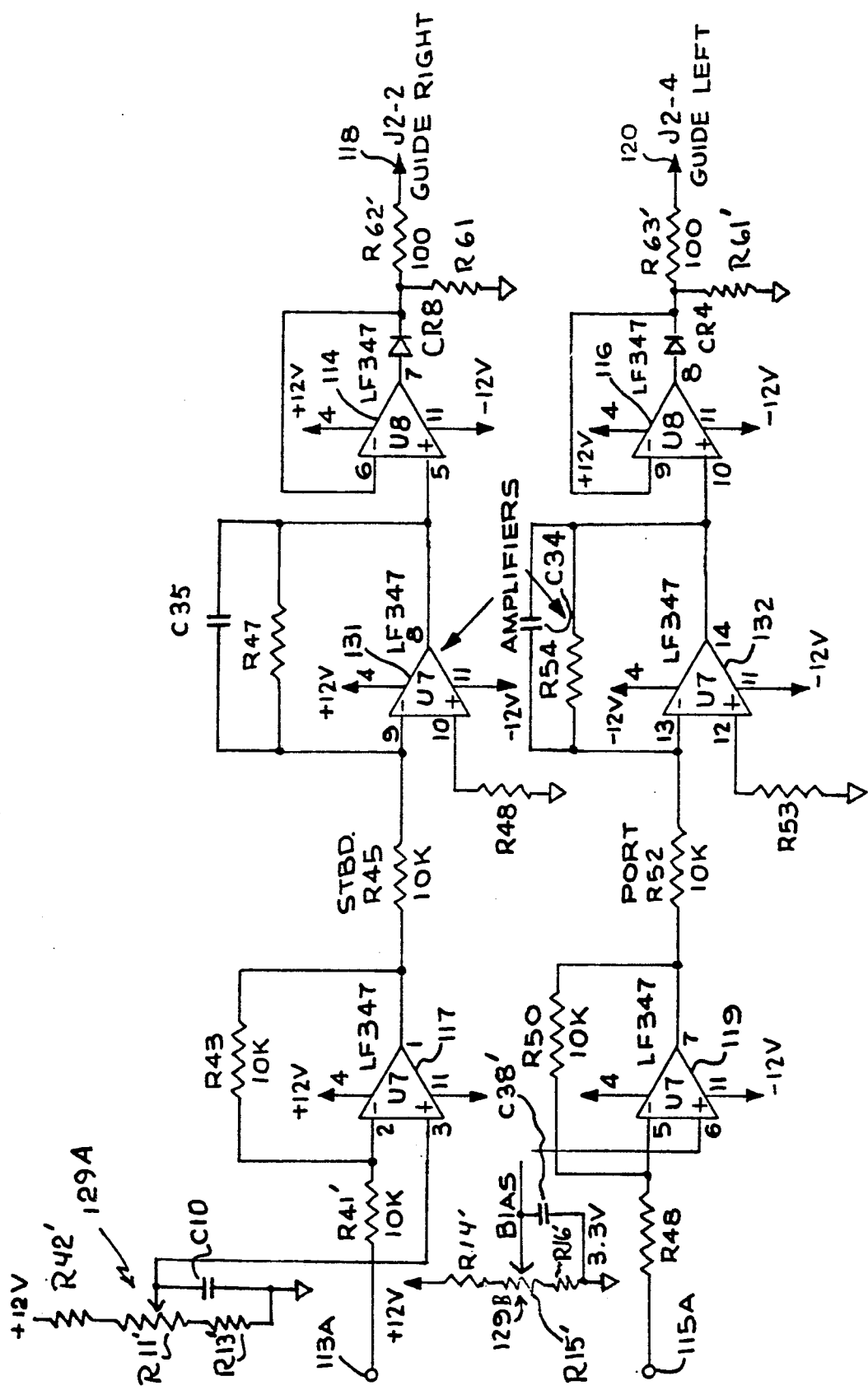
FIG. 12B. Circuit diagram, continued from FIG. 12A, of antenna output signal conditioning circuits for vehicle front-end terminal-positioning operation in which only a passive loop of wire is on the floor.

FIGS. 12A and 12B show a circuit diagram of a portion of the receiving equipment for receiving magnetic field information. The equipment of FIGS. 12A and 12B is part of block 151 of FIG. 14. In FIG. 12A the receiving antenna's coils 95 and 97 are shown at the left side of the figure with one terminal of each coil connected to ground. The instantaneous polarity of one coil relative to the other is indicated by the dots.

The circuits of FIGS. 12A and 12B are symmetrical for left and right signals so only the right channel will be described in detail. Coil 97 is connected to a preamplifier 109, which serves also as a lowpass filter to suppress high-frequency noise. The output of the preamplifier 109 is connected to a bandpass filter 109A with center frequency equal to the frequency of the transmitting oscillator 68'. The output of the bandpass filter is rectified by rectifier 113 to convert the signal to a DC value.

The DC output of rectifier 113 is connected via terminal 113A to a shifting amplifier 117. The non-inverting input of that same amplifier receives a bias from an adjustable voltage-dividing biasing circuit 129A, which, at the output of amplifier 117, offsets the signal that was received from rectifier 113.

The bias of amplifier 117 is a DC bias for offsetting the direct magnetic coupling received from the transmit antenna. The purpose of the bias is to remove as much of the direct coupling component of the signal as possible so that only the signal, from the guide wire is amplified, thus enabling a subsequent analog-to-digital converter 135 to be a high-resolution type.

It would not be necessary for the bias 129A to be adjustable because it is sufficient to offset the signal only slightly, but it is adjustable in the preferred embodiment. The left signal is later subtracted from the right signal in the motion control processor 61 anyway, so the portion of the direct signal that is not properly biased at amplifier 117 would be cancelled by the subtraction if the antennas are centered with respect to each other. However, an adjustable bias on both right (129A) and left (129B) sides eliminates the need to adjust the antenna assembly, and allows bias adjustments to be made manually any time after the antennas are fixed in position. An automatic bias adjustment embodiment is described below in a section called Automatic Bias-Setting Embodiment.

The motion control processor 61 can also observe what the offset is when the vehicle is far removed from any floor wire, store that offset value, and use it to compensate the signals received while processing.

An inverting amplifier 131 receives the DC output signal from the amplifier 117, and a half-wave rectifying, unity gain amplifier 114, which follows amplifier 131, outputs values greater than or equal to zero as required by the A/D converter.

In a similar manner the left-coil signal from coil 95 is processed by circuit elements 111, 115, 119, 132, and 116, to provide another output signal, at a terminal 120.

The terminals 118, 120, which have DC signals received from the right-side and the left-side coils 97, 95 respectively of the front-end receiving antenna 91, are shown also on FIG. 13. Four antenna input lines are not shown for clarity of presentation. They are the rear-end receiving antenna 91 inputs and analog inputs 160 and 167 from filters 157 and 163, described later. All six such inputs are connected to a multiplexed analog-to-digital (A/D) converter 135, which alternately converts signals on all input lines to eight-bit digital signals at an output bus 136.

Those digital signals are conducted to the vehicle's motion control processor 61. It is a Model DS5000 microprocessor manufactured by the Dallas Semiconductor Corporation.

Another input to the motion control processor 61 is received from an outer loop microprocessor 67, which is an Intel Corporation Model 80186 device. The AGVC 13 communicates with the outer loop processor 67. Data is transmitted between the AGVC 13 and the outer loop processor 67 by guide wires in the floor or by a radio link using an antenna 15.

Commands sent from the outer loop processor 67 to the motion control processor 61 include the desired vehicle speed and the ratio of the left and right wheel speeds, which controls the radius of curvature of travel.

However, when the terminal-positioning mode of the vehicle navigation and guidance system is being used, the ratio of the left and right wheel speeds is 1.0. The speed command is the same to the left wheel as to the right wheel; corrective signals are generated from the receive antenna and are combined with the speed commands to force the vehicle to track the wire. Therefore, the vehicle follows the path of the guide wire regardless of the path's layout (e.g., a non-straight path). Microcomputer programs for speed control of wheels of automatic guided vehicles are well known in the prior art.

In one travel direction, the port and starboard wheels delineate left and right direction, as is true when the vehicle is traveling in the forward direction. However, when the vehicle is traveling in the rearward direction, the port and starboard wheels delineate opposite hand directions, right and left, respectively. For this reason, inputs 118 and 120 as seen in FIG. 13 are received from the starboard and port side of the vehicle and are processed as right and left direction signals, respectively.

Digital data from the motion control processor 61 is conducted to a digital-to-analog (D/A) converter block 133. The block 133 contains two D/A converters 133A and 133B for starboard and port signals respectively. The analog signal at each of their output terminals 122, 124 is connected through a summing junction 175, 177 to a motor controller 21, 19, to motors 17, 15, and the drive wheels 10, 8. See FIG. 14.

During operation of the vehicle at places away from a terminal the AGVC 13 and the outer loop processor 67 provide commands to the motion control processor 61, which supplies signals through the D/As 133A, 133B to control the motion of the vehicle via its controllers, motors, and drive wheels.

During operation in a terminal the antennas 97, 95 receive induced signals from a loop of wire 54 on the floor, and provide signals through the circuits of FIGS. 12A and 12B and the A/D converter 135 of FIG. 13, then through the motion control processor 61, terminals 122, 124, junctions 175, 177, controllers 21, 19 (FIG. 14) and motors 17, 15. These error signals alter the speed commands of their respective wheels to position the vehicle laterally as desired in the terminal.

Summary of Passive Loop Positioning Operation

To summarize, the terminal-positioning mode of the vehicle navigation and guidance apparatus guides the vehicle over a passive wire as follows:

First, microprocessors 61 and 67 receive a signal from the AGVC 13 notifying them that the vehicle 2 is entering a terminal such as terminal 11. The transmitting antenna 71 is turned on by means of the analog switch 70, FIG. 6, which is controlled by the microprocessor 61.

Signals from the receiving antennas 91 are preamplified. The right-coil and left-coil signals are conditioned with identical electronic circuits, so the following description covers only the right-coil signal. The right-coil signal is routed through two different paths, namely the circuits of terminals 118 and 155, FIG. 14.

Figure 14:
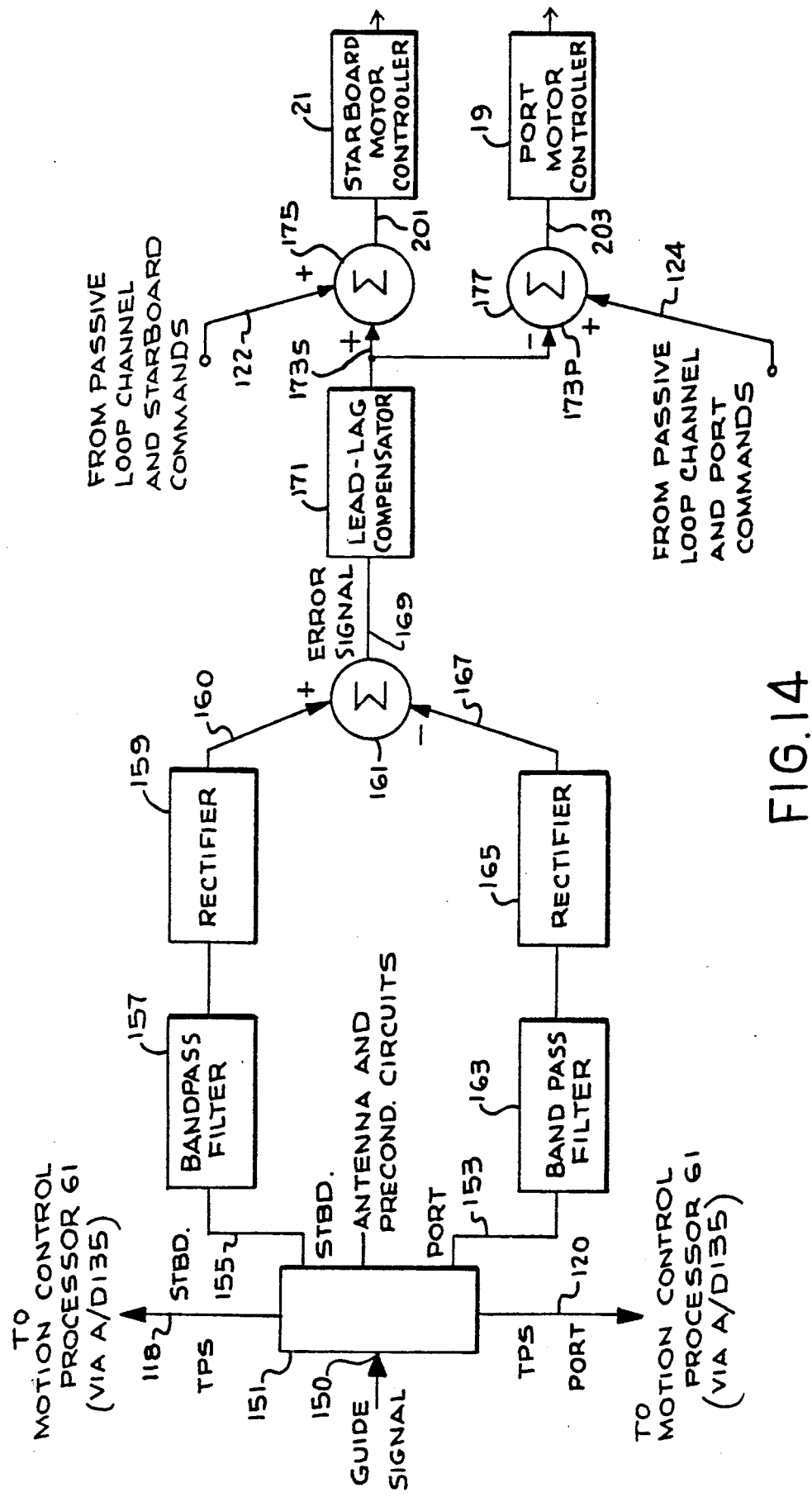
FIG. 14. Block diagram of equipment for guide-wire-tracking mode of operation of the vehicle. (See FIG. 15-17 for details.)

Within block 151 of FIG. 14, the right-coil signal is routed to a bandpass filter, rectified, inverted and added to (i.e., offset by) a bias, and amplified to obtain the signal at terminal 118. It is also routed to an attenuator to obtain the signal at terminal 155.

The signal at 118 goes through a path including the motion control processor 61, (and necessary A/D and D/A converters), FIG. 13. The signal at terminal 155 is amplified in a bandpass filter 157 and then rectified (159), and no bias is removed, leaving the difference at terminal 160 very small. Consequently the error signal is very small. The signal at 169 is switched off by the outer loop processor 67 while the vehicle is traveling in over a passive guide wire, to eliminate any possible undesirable effects. (See switch 170, FIGS. 4B and 16B).

Lateral Positioning of Vehicle over Active Guide Wires at Terminals and Elsewhere In the case of terminals such as terminal 9 of FIG. 1 that are approached on routes such as routes 3 of FIG. 1 (which have guide wires embedded in the floor), guide wires are used in the floor of the terminals also, to position the vehicle within the terminal. FIG. 14 shows receiving equipment on the vehicle for guide-wire operation both inside and outside a terminal, so far as lateral positioning of the vehicle is concerned.

As shown in FIG. 14, guide signals from a wire in the floor enter (at terminal 150) a block labeled "Antenna and Preconditioning Circuits" 151. Portions of this block 151 were already described in connection with FIGS. 12A and 12B, where terminals 118 and 120 are shown. Other portions of the block 151 will be described subsequently in connection with FIG. 15, but for purposes of explaining the general concept it is helpful to finish describing the block diagram of FIG. 14 first.

The Antenna and Preconditioning Circuits block 151 outputs an AC signal at a terminal 155, which goes to a bandpass filter 157. This filter is tunable to either guide-wire frequency, specifically 965 Hz or 1155 Hz. Two guide-wire frequencies are available to enable commanding the vehicle to select either one of two guide-wire paths at a fork.

The outer loop processor 67 alternates the center frequency of this bandpass filter 157 by means of an analog switch, which switches appropriate resistor values into the circuit to select the desired frequency, until a significant amplitude is detected, signifying acquisition of the guide wire. The filtered signal is fullwave rectified in a block 159. The result at terminal 160, which is from starboard signal channel, is sent to a non-inverting input of a summing junction 161.

A port channel output from the block 151 is at terminal 153. It is passed through a bandpass filter 163, then through a fullwave rectifier 165. At a terminal 167 it is entered into an inverting input of the summing junction 161. The output of the summing junction 161, at terminal 169, is an error signal. That error signal is passed through a lead-lag compensator 171, which is tailored to the dynamics of the system as a whole to provide stability, fast response, and high accuracy.

The output of the lead-lag compensator 171 is inverted and added to the starboard speed command 122 from the D/A 133A of FIG. 13 at summing junction 175. See also FIG. 4A for a broader view. The summing junction 175 outputs a signal at a terminal 201, which is connected to the starboard motor controller 21. That motor controller controls the motor 17 which drives the wheel 10, as described earlier.

The output from the lead-lag compensator 171 is connected also to another summing junction 177 without being inverted first. Summing junction 177 adds the compensated error signal 171 to the port speed command 124. The summing junction 177 outputs a signal to the port motor controller 19, which drives the port motor 15, hence the wheel 8. The elements 157 through 177 are on an analog circuit board.

Figure 15:
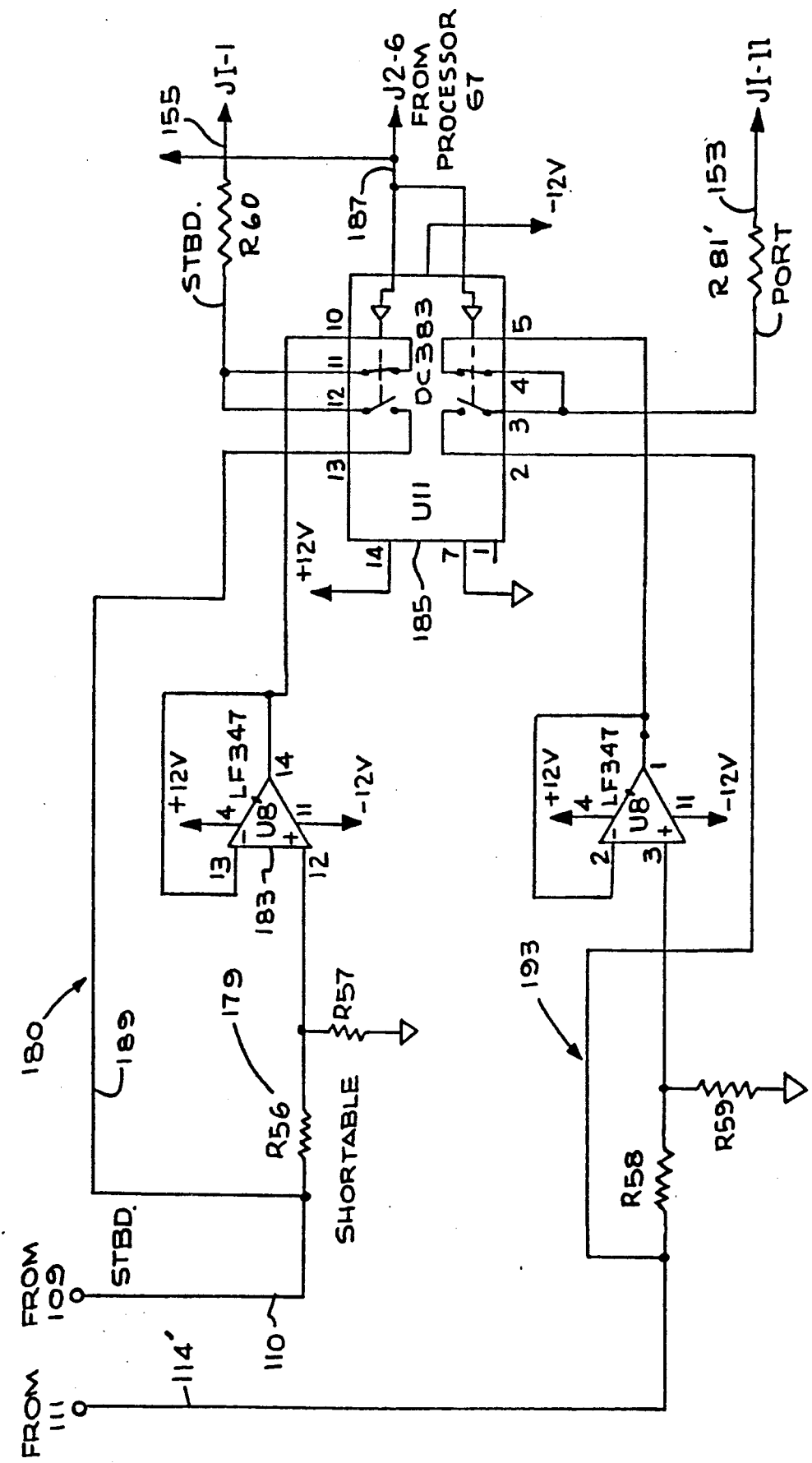
FIG. 15. Diagram of circuits including the receiving antennas, their preamplifiers, and short-circuitable attenuators (input portion of circuit) as used when the vehicle is relying on an active guide wire for position information.

Details of the lateral-control circuits on the vehicle for a guide-wire mode of operation are shown in FIGS. 15, 16 and 17, which will now be described. FIG. 15 shows connections 110, 114' from the preamplifiers 109, 111 that were shown on FIGS. 12A. The signal from preamplifier 109 goes to an attenuator 180 consisting of resistors 179, 181, and an amplifier 183.

That attenuator is arranged so that it can be short-circuited by an analog switch 185 upon receipt of a control signal (at a switch terminal 187) from the outer loop microprocessor 67. A short-circuiting conductor 189 is connected around the attenuator 180. One output of the analog switch 185, which comprises a pair of ganged single-pole single-throw switches, the switches associated with terminals 3 and 12 being normally open and the switches connected to terminals 4 and 11 being normally closed, interconnected to form a single double-pole double-throw selector switch, is at a terminal 155, for the starboard side signal.

In an identical way, the output of preamplifier 111 goes to a switchable attenuator 193 and through the analog switch 185 to an output terminal 153 for the port side.

In FIGS. 6 and 15 the analog switches 70 and 185 are arranged such that when the oscillator 68' is disconnected from the transmit antenna 71, the attenuators 180, 193 are short-circuited and do not attenuate. This situation occurs when the vehicle is relying on active guide wires for guidance.

At other times, the oscillator 68' feeds the transmitting antenna 71 (via switch 70) and the attenuators 180 and 193 are permitted (by switch 185) to attenuate the signals received from antenna coils 97 and 95. This situation occurs when the vehicle is relying on passive guide wires for guidance.

Terminals 153 and 155 are at the left of FIG. 16A, which shows a middle portion of analog circuits for receiving and processing signals when operating in the guide-wire mode. The starboard signal at terminal 155 of FIG. 16A is conducted through a switch to a bandpass amplifier filter 157, which is tuned to one of the guide-wire frequencies, i.e., 965 Hz or 1155 Hz. The output of bandpass filter 157 is rectified in rectifier 159, smoothed in filter 158 and sent to a summing junction 161.

At the same time the signal 153 of FIG. 16A passes through a bandpass filter 163, through a rectifier 165 and an amplifier 166, and is connected to another input terminal 167 of the summing junction 161. The output of summing junction 161, at terminal 169, passes through the lead-lag compensator 171 to the terminal 173.

In FIGS. 17A and 17B circuits are shown that follow FIG. 16B and are output portions of an analog board. These output portions sum the commands at terminals 122 and 124 from the microprocessor 61, with the compensated error signal at terminal 173 that drives the motor controllers. A signal of FIG. 17A at terminal 173 splits into terminals 173S and 173P. The starboard signal at 173S is inverted in device 197 and summed with the starboard speed command 122 at summing junction 175, then passes through some circuits 199 merely to select a forward or reverse direction of motion. It flows to an output terminal 201 that goes to the starboard motor controller 21. The circuits of this figure are of a conventional nature so their details are omitted from this description, although they are shown in detail in the included drawings.

The signal at terminal 173P of FIG. 17A is not inverted but is connected directly to a summing junction, 177, and passes through circuits similar to those just described to send a signal, at a terminal 203, to the port motor controller 19, as shown on FIGS. 14, 17A, and 17B. Junctions between FIGS. 17A and 17B are designated 174A, 174B, 174C, 176A, 176B, and 176C.

Operation of the Motion Control Processor

The following equations describe the operation of the microprocessor 61. The speed commands $C_S(n)$ and $C_p(n)$ are signals that originate from the AGVC 13 and that are sent from the outer loop microprocessor 67 to the motion control processor 61. These signals are added in microprocessor 61 to the compensated error signal $e_c(n)$ to yield the resultant signals $R_s(n)$ and $R_p(n)$, which serve as inputs to the summing junctions 175 and 177, at terminals 122 and 124 of FIG. 14.

The quantity e(n) is a measure of how far the vehicle is off-center from the floor wire; a zero value of e(n) means that the vehicle is centered over the wire. The e(n) signal could be programmed to call for an offset. If the floor wire were at an incorrect position laterally, the fault could be compensated by having the program cause the vehicle to operate off to one side of the wire. For example, the vehicle could be offset by two inches by simply adding a term to the error signal e(n).

The term $e_c(n)$, which is the compensated error signal, is the output of a digital filter in microprocessor 61 that provides dynamic loop compensation of the closed control loop. It involves the current value and recent values of the error signal e(n), as well as recent values of the compensated error signal $e_c(n)$.

The loop control equations that are implemented by microprocessor 61 are as follows:

$C_S(n)$ = speed command for starboard motor 17 at time n (originates from AGVC 13).

$C_p(n)$ = speed command for port side motor 15 at time n (originates from AGVC).

where n = time index, which is incremented sequentially.

$A_r(n)$ = signal received from terminal-positioning mode of the vehicle navigation and guidance system antenna of the right coil at time n, and processed. (Terminal 136 of FIG. 13).

$A_1(n)$ = signal received from terminal-positioning mode of the vehicle navigation and guidance system antenna of the left side coil at time n, and processed.

e(n) = error in lateral position of vehicle relative to the lateral offset position which is relative to the floor wire, as earlier described.

$$e(n) = k_1 A_1(n) - k_2 A_r(n) + L_t$$

where $k_{1,2}$ = gain, which is to be determined in each design case.

$L_t$ = lateral offset for a selected terminal $e_c(n)$ = dynamically compensated error signal at time n.

$$e_c(n) = a_1 e_c(n-1) + a_2 e_c(n-2) + a_3 e(n) + a_4 e(n-1) + a_5 e(n-2).$$

where $a_i$ = constant coefficients, selected for stability compensation of the closed-loop system. i = 1–5.

$R_s(n)$ = resultant command for starboard motor 17 at time n.

If $e_c(n)$ is less than zero, then $$R_s(n) = C_s(n) + e_c(n);$$

else $R_s(n) = C_s(n)$. An output of the microprocessor 61. Starboard input to the summing junction 175. See FIG. 14.

$R_p(n)$ = resultant command for port-side motor 15 at time n.

If $e_c(n)$ is greater than or equal to zero, then $$R_p(n) = C_p(n) - e_c(n);$$

else $R_p(n) = C_p(n)$. An output of the microprocessor 61. Port-side input to the summing junction 177.

Tests performed as described above assure that the resultant commands are always less than the speed commands.

Summary of Guide-Wire Tracking

To summarize, the terminal-positioning mode of the vehicle navigation and guidance system apparatus guides the vehicle on a guide-wire portion 3 of an installation in the following manner. The transmitter assembly 68', 69, 71 is turned off by means of the switch 70 of FIGS. 5 and 6. Signals from guide wires, received at the receiving antenna 91, are preamplified (FIG. 15) and routed directly to an analog circuit board (FIG. 14). The starboard and port signals $C_s(n)$ and $C_p(n)$ above replicate, with opposite signs, the commands being received at terminals 122 and 124 from the microprocessor 61. The summing junctions 175 and 177 output speed commands, varied slightly by error signals, to control the motors 15 and 17 to drive the vehicle.

Use of the Vehicle Navigation and Guidance Apparatus in Two Guidance Modes—Namely Active Guide Wire and Self-Contained Navigation and Guidance Certain components are used in common, at terminals and elsewhere, by both the terminal-positioning mode of the vehicle navigation and guidance system for passive floor loops and the guide-wire guidance mode. The guidance system as a whole may have a portion of its routes (routes 3) in which vehicle guidance is provided by guide wires in the floor. The terminal-positioning mode of the vehicle navigation and guidance system can be used to track those floor guide wires.

The components that are used in common include the receiving antennas 47, the FIG. 17 portion of the analog board 49, the preamplifiers shown in FIG. 12A, the controllers 19, 21 of FIGS. 4 and 14, the motors 15 and 17 of FIG. 4A, and of course the wheels 8, 10.

Wire-Crossing Detection for Longitudinal Positioning of Vehicles

Longitudinal positioning of the vehicle 2A at terminal 9 or 11 is accomplished by sensing the location of the vehicle with respect to a wire that extends transversely across the floor in the terminal area. Current in the transversely-disposed conductor produces an alternating magnetic field surrounding it. The current can be due to active conductive energization of the wire or can be induced by transformer action from a transmitting antenna on the vehicle that generates a magnetic field. The magnetic field encircles the wire so that, at a particular instant, its direction is upward at one side of the wire, is horizontal directly over the wire, and is downward on the other side of the wire.

Magnetic coils for sensing the presence and location of the wire crossing are shown on FIG. 7. The three coils on the left side are a front coil 205, a middle coil 207, and a rear coil 209. The coils on the starboard side are: front 211, middle 213, and rear 215.

When these coils are in place on the vehicle their axes are vertical so that their turns are horizontal. Consequently when the middle coil 207 is directly over a current-carrying wire at the floor, magnetic flux passes through the front coil 205 in one direction, say upward, at the same time that magnetic flux passes through the rear coil 209 in the opposite direction, i.e., downward. At that same time flux in the coil 207 does not link any turns because the flux there is horizontal and the coil's turns are horizontal.

When the coil 207 is directly over the current-carrying floor wire, an alternating magnetic flux would therefore produce one phase of signal in the coil 205, an opposite phase of signal in the coil 209, and zero signal in the coil 207. The principle of operation of the apparatus in detecting the longitudinal location of the vehicle by means of wire-crossing detection is based on these three signals.

Figure 18:
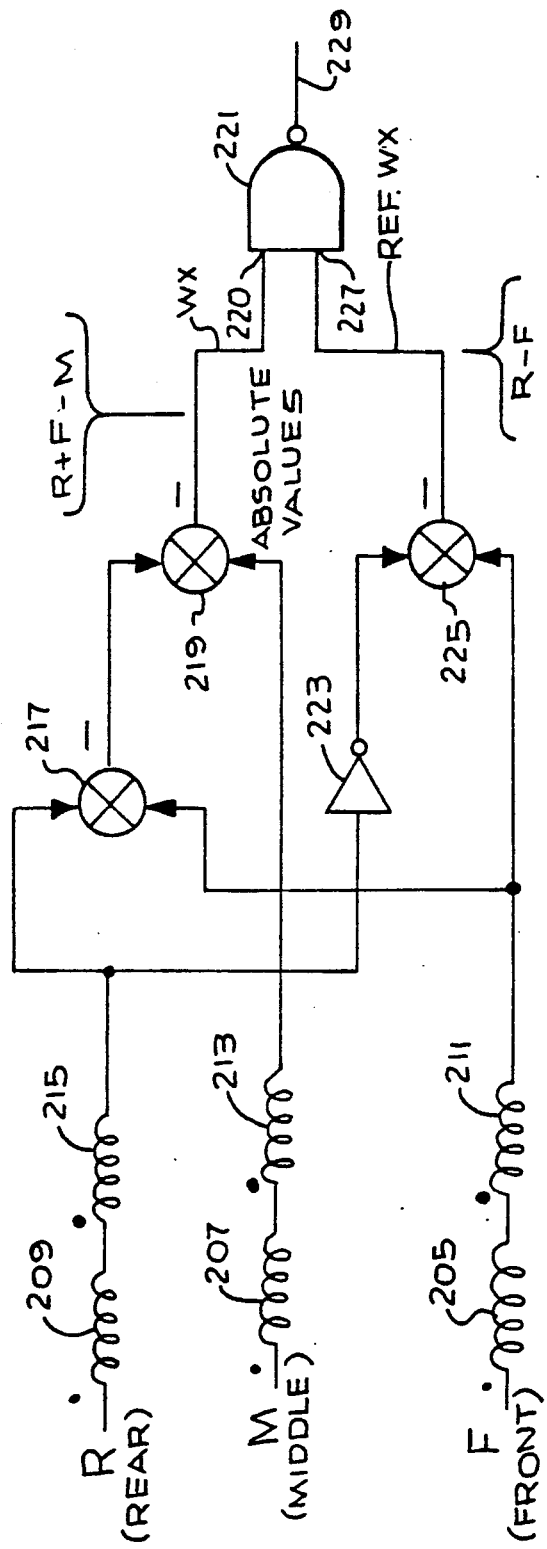
FIG. 18. Simplified diagram of wire-crossing detection circuits. (See FIG. 19 for details.)

The method of combining the three signals is shown in FIG. 18, which is simplified in order to illustrate the concepts. Signals can occur in either coil 209 alone, or 215 alone, or both simultaneously. A signal from coils 205 and 211 is added to a signal from coils 209 and 215 at a summing junction 217. The sum is inverted and added to a signal from the middle coils 207 and 213 at a summing junction 219. The output of summer 219 is inverted and applied as an input 220 to a NAND gate 221.

The signal from coils 209 and 215 is also inverted in an inverter 223 and is input to a summing and inverting amplifier 225. This signal is added to a signal from the coils 205 and 211 by summing and inverting amplifier 225. The output of the summing and inverting amplifier 225 is inverted and applied to a second input 227 of the NAND gate 221.

The signal at the first input 220 is a "wire-crossing signal" WX while the signal at terminal 227 is a "wire-crossing reference signal" REFWX. Absolute values of the signal WX and the signal REFWX are used at the terminals 220 and 227. The output of NAND gate 221 is terminal 229.

When a vehicle drives into a terminal it approaches a transversely lying wire 87 on the floor acrross the path of the vehicle. Only the left-hand coils will be discussed. Before the vehicle arrives at the wire, all three of the coils 205, 207 and 209 are linked by some alternating magnetic flux from the wire and all three of their signals are in phase. For simplicity of discussion, this phase is referred to as "downward" flux.

When the vehicle has advanced to where only the front coil 205 has crossed the wire on the floor, the coil 205 has "upward" flux and the coils 207 and 209 still have downward flux. That is, the instantaneous polarity of the output signal from the front coil 205 is opposite the polarity of the middle and rear coils 207, 209. When the vehicle has advanced to where the middle coil 207 is directly over the floor wire, coil 205 has upward flux, coil 207 has zero linking flux (because the flux is parallel to the plane of its coils), and the rear coil 209 has downward flux.

The signal at point 220 of FIG. 18 is the rear coil's signal plus the front coil's signal minus the middle coil's signal. When the middle coil 207 is directly over the floor wire 87 the signal from the front coil 205 is equal and opposite to the signal from the rear coil 209 so those terms cancel. At the same time the signal from the middle coil 207 is a minimum, so the signal at point 220 is zero. This represents a wire-crossing position.

At that time the reference signal at a point 227 is a maximum because that signal is the rear coil's signal minus the front coil's signal. Since the signals from these two coils 205 and 209 are of opposite polarity at that time, their algebraic difference becomes the sum of the magnitudes of the two, so it is a maximum.

The logic circuit involving NAND gate 221 and circuits leading up to it are arranged so that when the signal at 220 is crossing zero and the signal at 227 is relatively great (although not necessarily a maximum) the NAND gate 221 outputs a logic signal at the point 229 that is suitable for indicating that the vehicle is directly over the wire crossing. That output at 229 is low when a wire crossing is detected.

Figure 19:
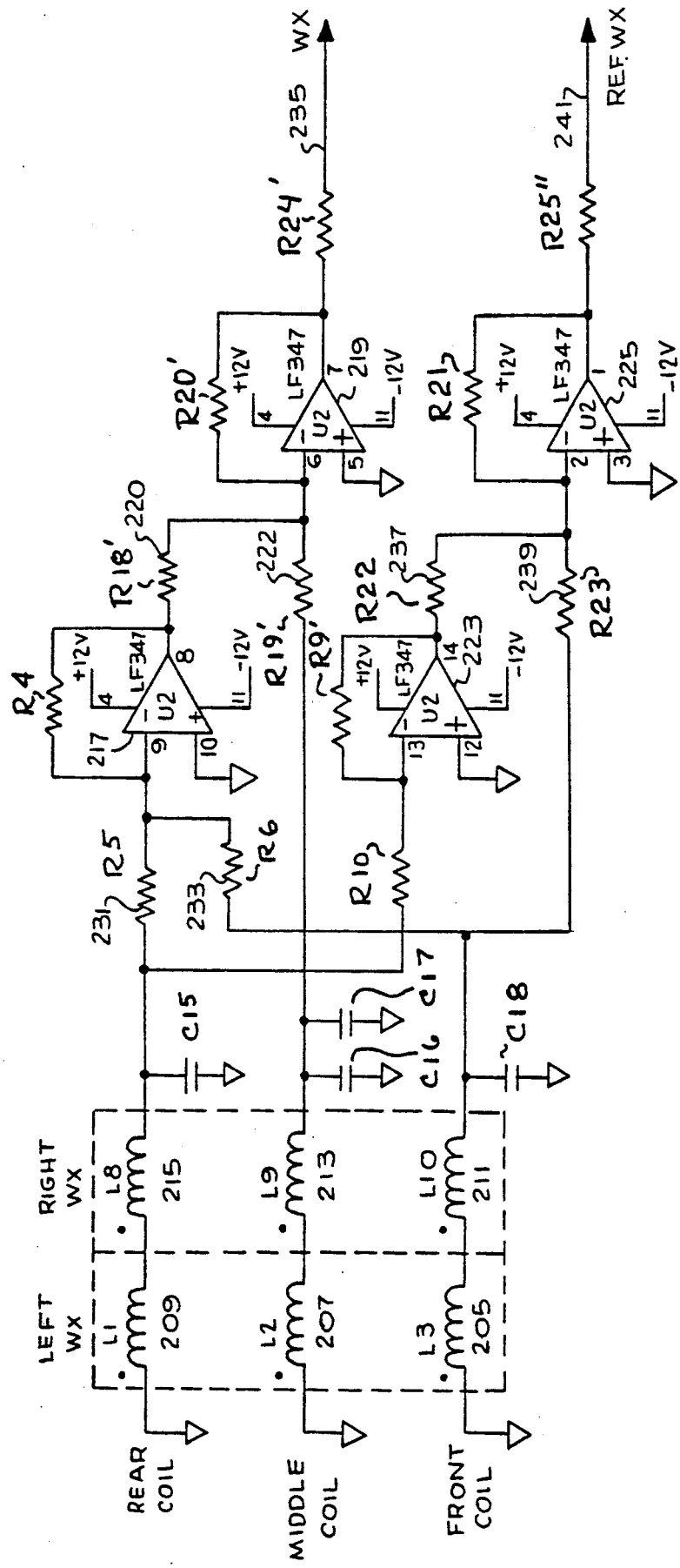
FIG. 19. Circuit diagram of wire-crossing detection circuits including antennas (i.e., coils) and signal-combining circuits.
Figure 20:
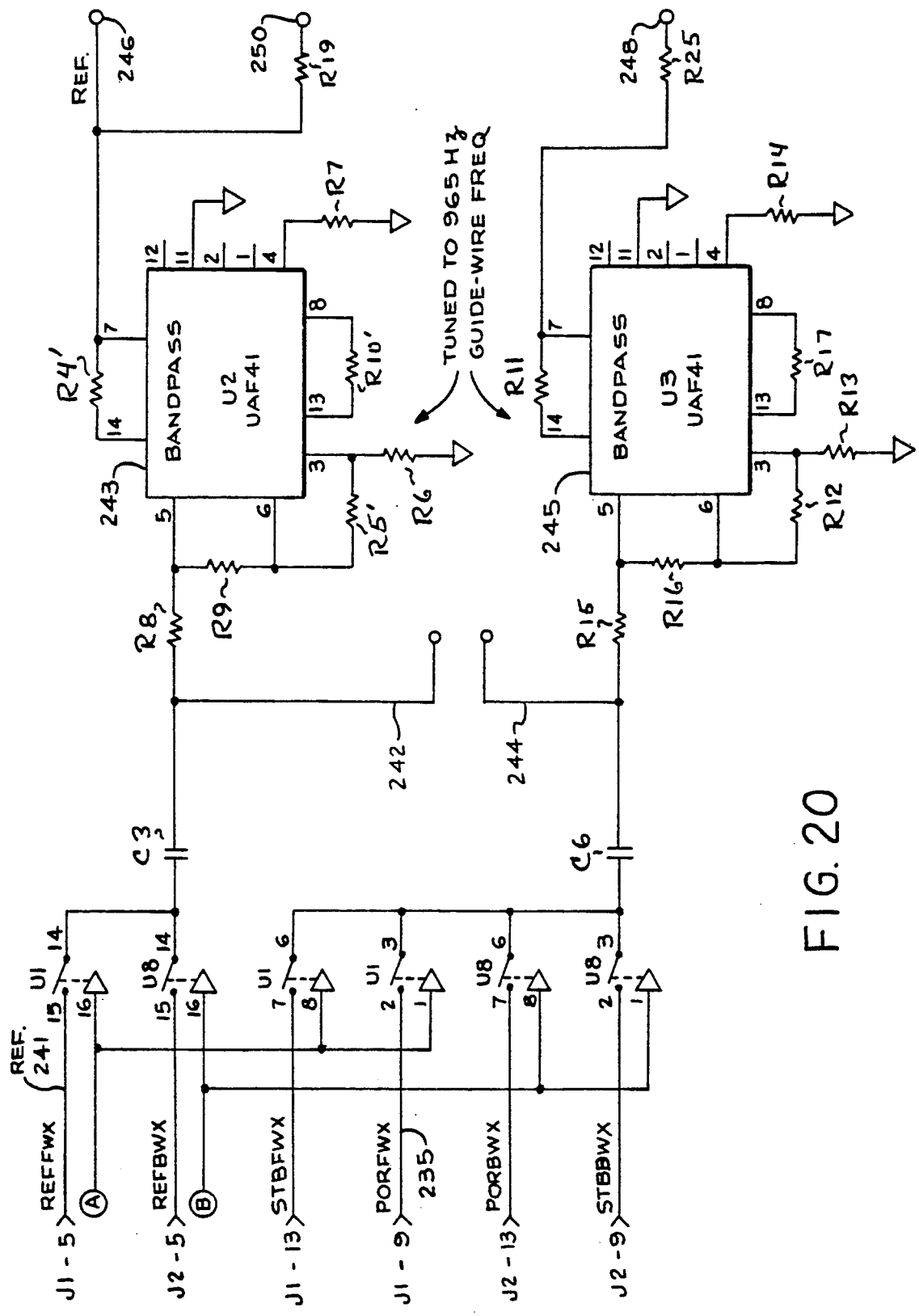
FIG. 20. Circuit diagram of a portion of wire-crossing detection apparatus tuned to a frequency assigned for active guide-wire operation of the vehicle.

Details of the wire-crossing circuits are shown in FIGS. 19 and 20, and some waveforms at selected points in the circuit are shown in FIGS. 23 through 27.

In FIG. 19 the coils 209 and 215 are in series and are connected through a resistor 231 to one input of an inverting summing junction 217. Coils 205 and 211 are connected in series, and are connected through resistor 233 to a second input of the summing junction 217. The output of the summing junction 217 is connected through a resistor 220 to one input of another summing junction 219. A second input to the summing junction 219 comes from a series connection of the middle coils 207 and 213, through a resistor 222. The inverted output of summing junction 219 is at a terminal 235, which is shown in both FIG. 19 and FIG. 20.

The output of coils 209 and 215 of FIG. 19 is connected also with an inverter 223, whose output is connected through a resistor 237 to an input of summing and inverting amplifier 225. Another input of the summing and inventing amplifier 225 comes from the series-connected coils 205 and 211, through a summing resistor 239. The summing and inventing amplifier 225 is connected so as to invert the summed signal.

The output of summing and inverting amplifier 225 is at terminal 241, which is shown on both FIG. 19 and FIG. 20. The signal at terminal 235 is the wire-crossing signal itself and that at 241 is the reference wire-crossing signal. The circuits of FIG. 19 are used in common to detect wire crossings that are (a) directly energized as in terminal 9 of guide-wire routes 3, and (b) passive induction loops as at terminal 11.

On FIG. 20 the signals at terminals 235 and 241 are connected through switching to bandpass filters 243 and 245. They are tuned to receive 965 Hz, which is the active guide wire frequency. A similar other subcircuit, of FIG. 22, to be described later, is tuned to 1155 Hz, which is the frequency of the transmitter on the vehicle that is used for exciting passive loops in the floor mat at a terminal. The 1155 Hz circuit is connected at terminals 242 and 244.

Figure 22:
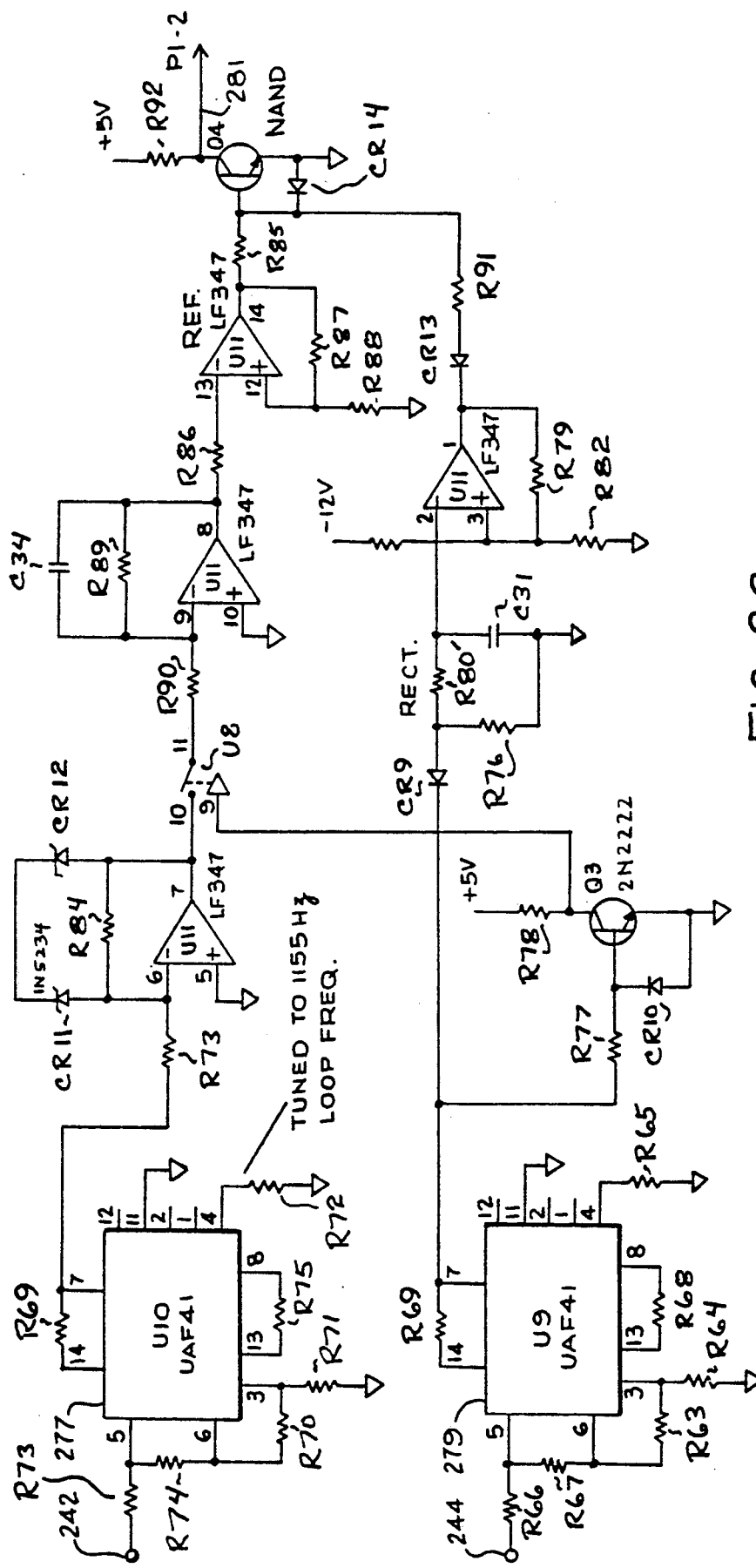
FIG. 22. Circuit diagram of a portion of wire-crossing detection apparatus tuned to a frequency assigned for passive wire loop operation in a terminal.

The two frequencies 965 Hz of FIG. 20 and 1155 Hz of FIG. 22 are used in a guidewire system for causing the vehicle to branch to a first or second route at a junction such as a "T", by applying an appropriate frequency to the guidewire when the vehicle approaches the junction. However, in a terminal having a passive loop, the receiver subchannel of 1155 Hz frequency is used for detecting a passive loop signal, whose energy originated with the onboard transmitter 68, and the receiver subchannel of 965 Hz frequency is used for detecting a conductively energized active guidewire crosswire at the terminal.

Thus the 1155 Hz passive-wire-crossing subchannel 277 (see FIG. 4), is used for detecting a passive loop when the vehicle is in a terminal, and is used for detecting a junction guide wire when the vehicle is not in a terminal. The 965 Hz guide-wire-crossing subchannel 243 of FIG. 4 is dedicated to only guide-wire sensing, both in and out of terminals.

Figure 21:
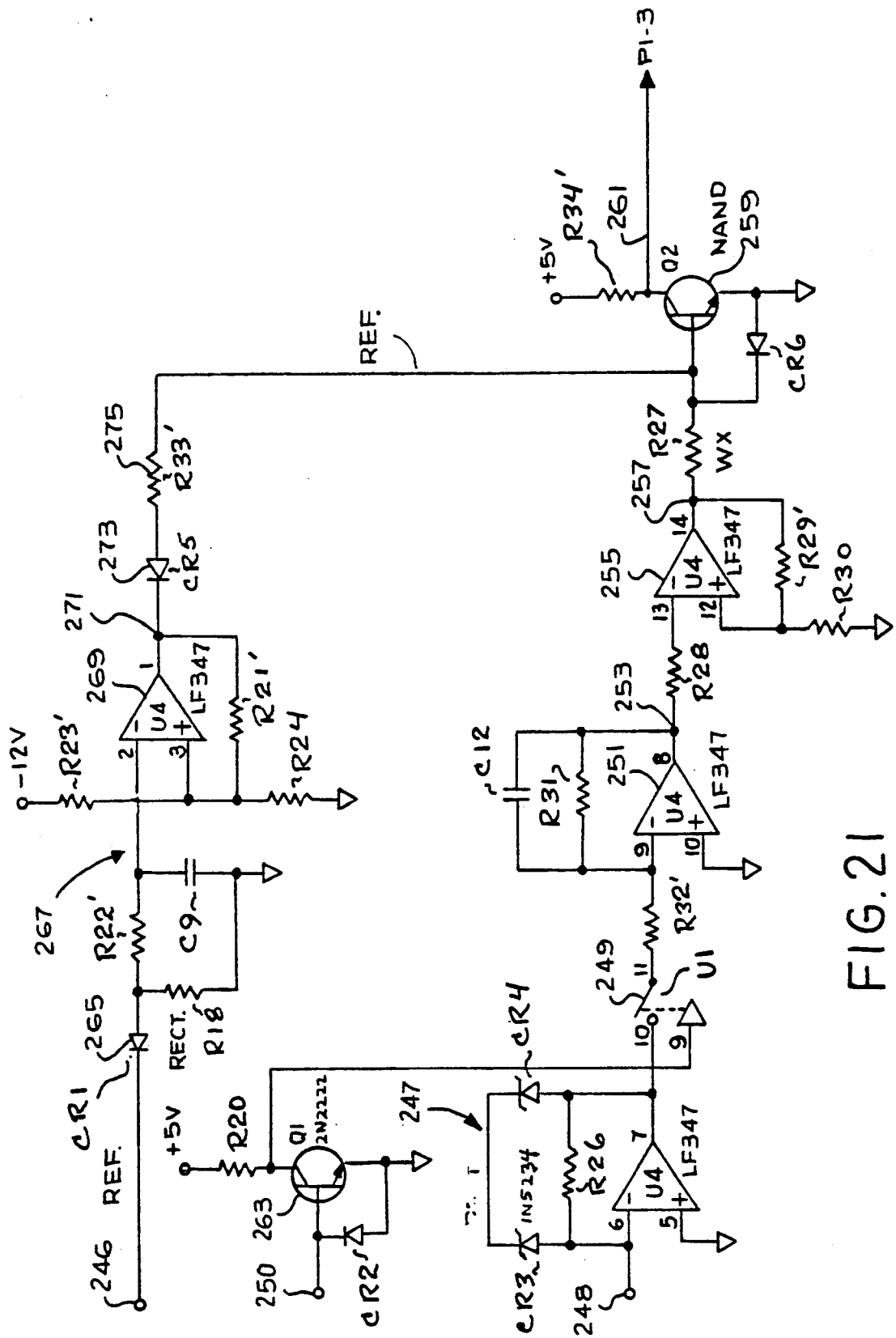
FIG. 21. Circuit diagram, a continuation of FIG. 20, of a portion of wire-crossing detection apparatus tuned to a frequency for active guide-wire operation.
Figure 23:
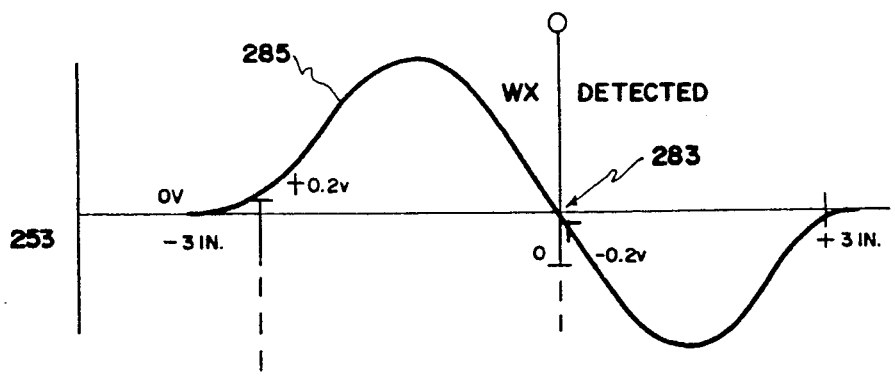
FIG. 23-27. Signal waveforms at various points in the wire-crossing detection circuit of FIG. 21, namely at terminals 253, 257, 267, 271, and 261, respectively.

On FIG. 20, the signal of terminal 235 passes through switching to a bandpass filter 245. FIG. 21 is a continuation, at terminals 246 and 248, of FIG. 20. The output of filter 245 passes through an amplifier circuit 247, a switch 249, and an inverting amplifier 251. The output of inverter 251 is shown in the graph of FIG. 23. That graph is the detected wire-crossing signal at a terminal 253.

Figure 24:
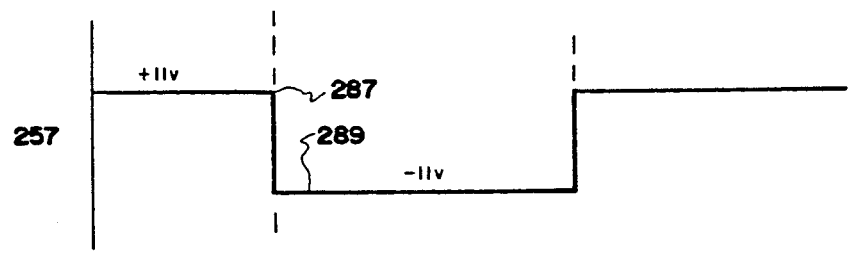

That signal passes through an amplifier 255 that eliminates the negative-going portion of signal and squares off the positive-going portion of the signal and inverts it, to produce the signal shown in the graph of FIG. 24. That signal appears at a point 257 of FIG. 21. It corresponds to the WX signal at terminal 220 of the simplified diagram of FIG. 18. Terminal 257 is connected to a transistor 259 in such a way as to perform a logical NAND function. The output signal, at terminal 261, is shown on the graph of FIG. 27.

On FIG. 20, the reference channel of terminal 241 goes to a bandpass filter 243. One output of the filter 243 goes via a terminal 250 to a transistor amplifier circuit 263 as shown on FIG. 21. The SPST switch 249 is controlled by the transistor amplifier circuit 263 and hence by the reference signal at 253. That reference signal turns on the cross-wire signal channel 251 when a strong reference signal is present and positive. (See FIG. 24).

The reference-channel bandpass filter 243 also outputs a signal through a diode 265 to an inverting input terminal 267 of an amplifier 269, FIG. 21. The waveform at input terminal 267 is shown on the graph of FIG. 25. It is a negative-going signal whose magnitude increases as the vehicle approaches the center of the cross wire and whose magnitude diminishes as the vehicle continues past the center. It is the algebraic sum of the outputs of the front and rear coils.

Figure 25:
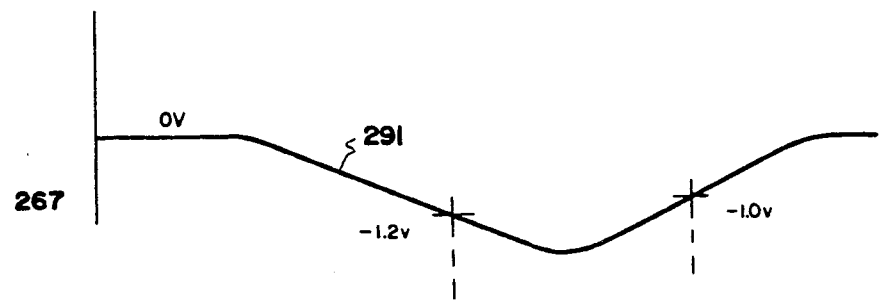
Figure 26:
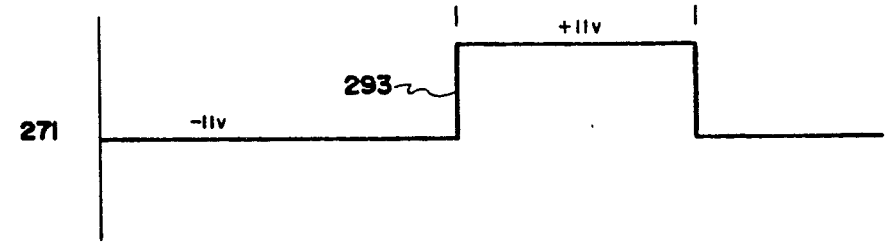
Figure 27:
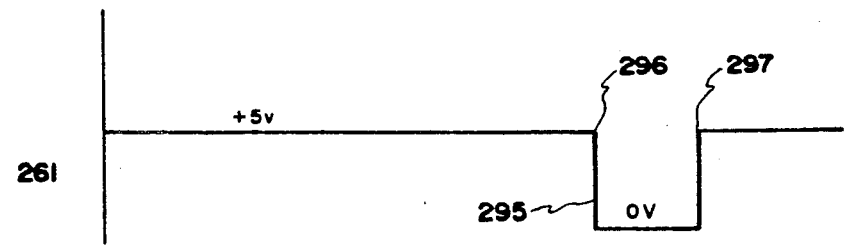

At a threshold of minus 1.2 volts the reference signal at 267 is tripped. Amplifier 269 is configured as a Schmitt trigger with about 0.2 volts of hysteresis. The threshold for decreasing magnitude is 1.0 volt, as shown in FIG. 25. This threshold is passed as the vehicle continues forward past the wire cross. The output of the amplifier 269, at a terminal 271, is shown as a large square graph 293 in FIG. 26.

The square graph 293, which has a range from negative 11 volts to positive 11 volts, is applied through a diode 273 and a resistor 275 to the base of transistor 259. That signal serves as the reference-channel input to the NAND gate whose principle component is transistor 259. Transistor 259 is part of the NAND gate 221 of the simplified diagram of FIG. 18.

The circuit of FIG. 22 has bandpass filters 277 and 279, both of which are tuned to 1155 Hz for passive loops. Otherwise, the circuit of FIG. 22 is identical to that of FIG. 21. The output of the circuit of FIG. 22 is at a point 281. This is the cross-wire signal output when a passive loop is used instead of an active guide wire.

The curves of FIGS. 23 through 27 are aligned vertically over each other to provide the same vehicle-position scale on the abscissa for all of them. Collectively they portray what happens in the circuit when a guided vehicle having antennas 205–215 as in FIG. 7 enters a terminal and drives over a wire-crossing that it must detect for purposes of longitudinally positioning the vehicle. The abscissa of all of the graphs of FIGS. 23 through 27 is distance expressed in inches, as measured positively and negatively from a zero point 283 on FIG. 23. Point 283 is the vehicle's position when the middle coil 207 is directly over the wire-crossing on the floor.

As shown in FIG. 23, at a distance of −3 inches, a curve 285, which is the wire-crossing signal at terminal 253 of FIG. 21, has increased to a +0.2-volt level. Amplifier 255 trips its output from positive saturation level to negative saturation level 289 at a point 287 in FIG. 24. The graph at FIG. 24 is the signal at terminal 257 of FIG. 21, as a function of the vehicle's longitudinal position.

On FIG. 23, when the curve 285 decreases (at a short distance to the right of the zero-point 283) to a level more negative than −0.2 volts, which is the negative threshold level of amplifier 255, the output signal at terminal 257 returns to a positive saturation level. The signal 289 essentially serves as one input of the NAND gate 259.

Turning now to the reference signal channel of FIG. 21, a signal at terminal 267 diminishes gradually from zero to a minimum at the wire-crossing center represented above by point 283. The waveform at terminal 267 of FIG. 21 is the V-shaped waveform 291 of FIG. 25. As the signal 291 decreases past −1.2 volts, amplifier 269 is triggered to saturate to the positive rail. Alternatively, as signal 291 increases past −1.0 volt, amplifier 269 is triggered to saturate to the negative rail. The output signal at terminal 271 is shown as waveform 293 in FIG. 26.

At the output terminal 261, a negative-transition pulse 295 is produced at a wire cross. As shown on FIG. 27, its leading edge 296 occurs at a place very slightly more positive than the zero center point 283 of the wire 87 on the floor. Its positive-going edge, if the vehicle were to continue in a forward motion, would occur at a position 297 on FIG. 27. The output signal at terminal 261 is a positioning signal whose edge 296 indicates that the middle coil 207 is almost directly over the wire-crossing. This signal goes to the motion control processor 61 to stop the vehicle and/or control its repositioning, by means of well-known computer control programming techniques.

Measurement of Heading of Vehicle, in One Embodiment of the Invention

In one preferred embodiment, one sensing antenna 47 is mounted at the front of the vehicle and another sensing antenna 47A is mounted at the back of the vehicle, as shown in FIG. 11. A measurement of the lateral offsets of the center of each of the antennas 47 and 47A from a central longitudinal wire segment 307 on the floor indicates the vehicle's heading. The net difference in offsets divided by the longitudinal spacing 308 between the antenna assemblies 47, 47A is the tangent of the heading angle of the vehicle relative to the wire 307.

The signals from antennas 47 and 47A are processed in the manner described in detail above and subtracted in a comparator 309 and entered into a portion 61A of the microcomputer 61. See FIG. 11. Stored in the microcomputer 61 is information as to the longitudinal spacing 308 between the two antennas, which enables the computer to compute the vehicle's heading.

Alternative Receiving System Embodiment Having Phase-Locked Loops

Figure 28:
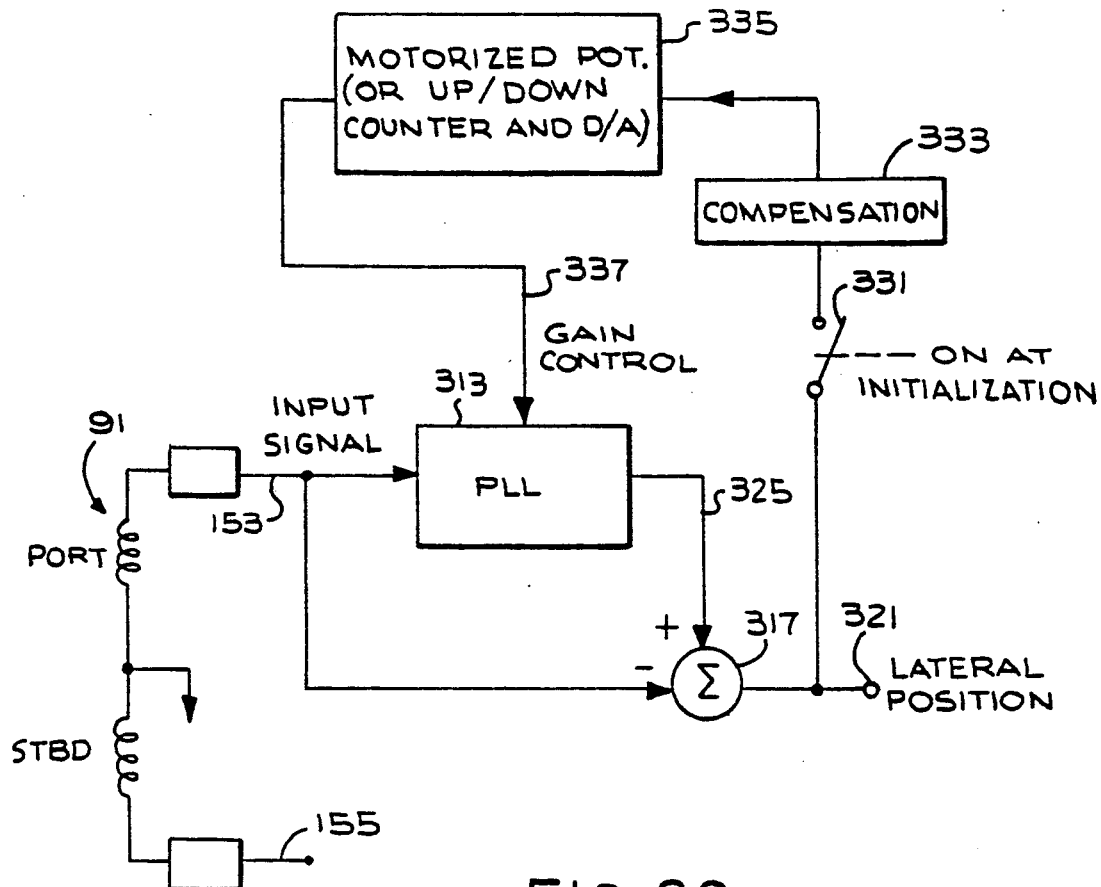
FIG. 28. Block diagram of an alternative embodiment of the invention that uses phase-locked oscillators in a portion of the system for processing signals from lateral-position-detecting antennas.
Figure 29:
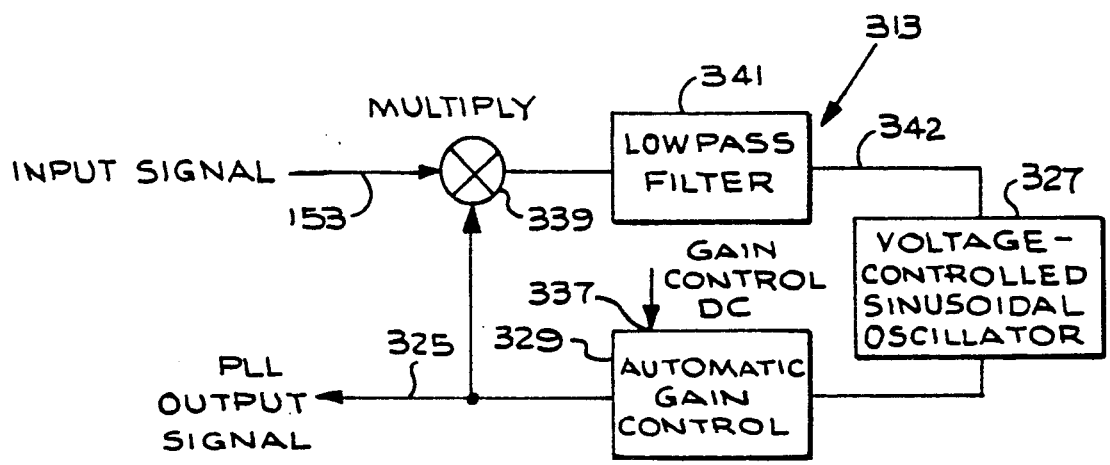
FIG. 29. Block diagram of a phase-locked oscillator having automatic gain control, used in FIG. 28.

An alternative embodiment of the apparatus for determining lateral position of a vehicle incorporates a phase-locked loop (PLL). FIGS. 28 and 29 show this embodiment, which is an AC biasing system for compensating for (i.e., subtracting) the component of signal that is received at antenna 91 directly from the transmitting antenna 71.

The filtered and amplified signals from the lateral receiving antenna 91 are at terminals 153, 155 of FIGS. 15 and 28. The left-side signal at 153 is input to PLL 313 and subtracted in a summing amplifier 317 from the output (at 325) of the PLL 313, as shown in FIG. 28. The difference is a voltage at terminal 321, whose amplitude is approximately proportional to the vehicle's lateral position. The PLL 313 is shown in more detail in FIG. 29. The output 325 of the PLL 313 is the output of a sinusoidal voltage-controlled oscillator (VCO) 327, which is part of the PLL 313, as made clear by FIG. 29. The right-side signal at terminal 155 is processed by similar circuits.

The VCO 327 produces a signal whose phase is locked to the phase of the input signal 153. This is accomplished by multiplying the output of oscillator 327 (as modified by a gain-control circuit 329, under control of DC voltage at a terminal 337) in a multiplier 339. The output of 339 is a DC signal representative of the phase difference, or phase error, between the output of the VCO 327 and the input signal 153, and is attempted to be driven to zero by the PLL.

This DC signal enters a lowpass filter 341, whose output at 342 is used to control the phase of the VCO 327, (the oscillator's frequency being the time rate of change of its phase). This arrangement provides a final output signal at terminal 325, which is a robust AC signal having the same phase as that of the input signal 153. The circuit of FIG. 29 is block 313 of FIG. 28.

To make this alternative embodiment more refined, the automatic gain control 329 is employed during initialization to set up the amplitude of the output of the VCO 327 to be equal to the signal voltage at the terminal 153 under conditions described below.

The operation of the embodiment shown in FIGS. 28 and 29 is as follows. The phase of the left signal is tracked by the PLL 313 of FIG. 28 (and the phase of the right signal is tracked by a corresponding PLL). The PLL 313 provides at its output 325 a signal of pre-adjusted amplitude (which is set upon initialization), and of phase that tracks the phase of the received signal at terminal 155.

Initialization is performed far away from floor wires. The only input signal at that time is that which is induced directly in antenna 91 by a magnetic field produced by the transmitting antenna 71. To initialize the system a switch 331 is closed and a motorized potentiometer 335 (or alternatively an up/down counter and a D/A converter) are adjusted to achieve a DC level at terminal 337 such that the output signal of the PLL 313 is at a certain amplitude. That certain amplitude is the value at which the PLL's output signal 325 is exactly equal to the input signal 155 as determined by the summing amplifier 317.

The switch 331 is then opened. The motorized potentiometer 335 remains in the position in which it was set during initialization. It continues to control the gain of block 329 via terminal 337 so that the amplitude of the output signal at 325 from the PLL 313 remains the same as it was at initialization. If the signal 155 changes in amplitude, the lateral position signal at output 321 changes.

The signal at terminal 321 can be bandpass filtered, fullwave rectified, subtracted from the signal of the right-side receiving antenna, and used for control in the same manner as is shown starting with terminal 155 in the embodiment of FIG. 14.

Alternative Transmitting Antenna Placement

Figure 30:
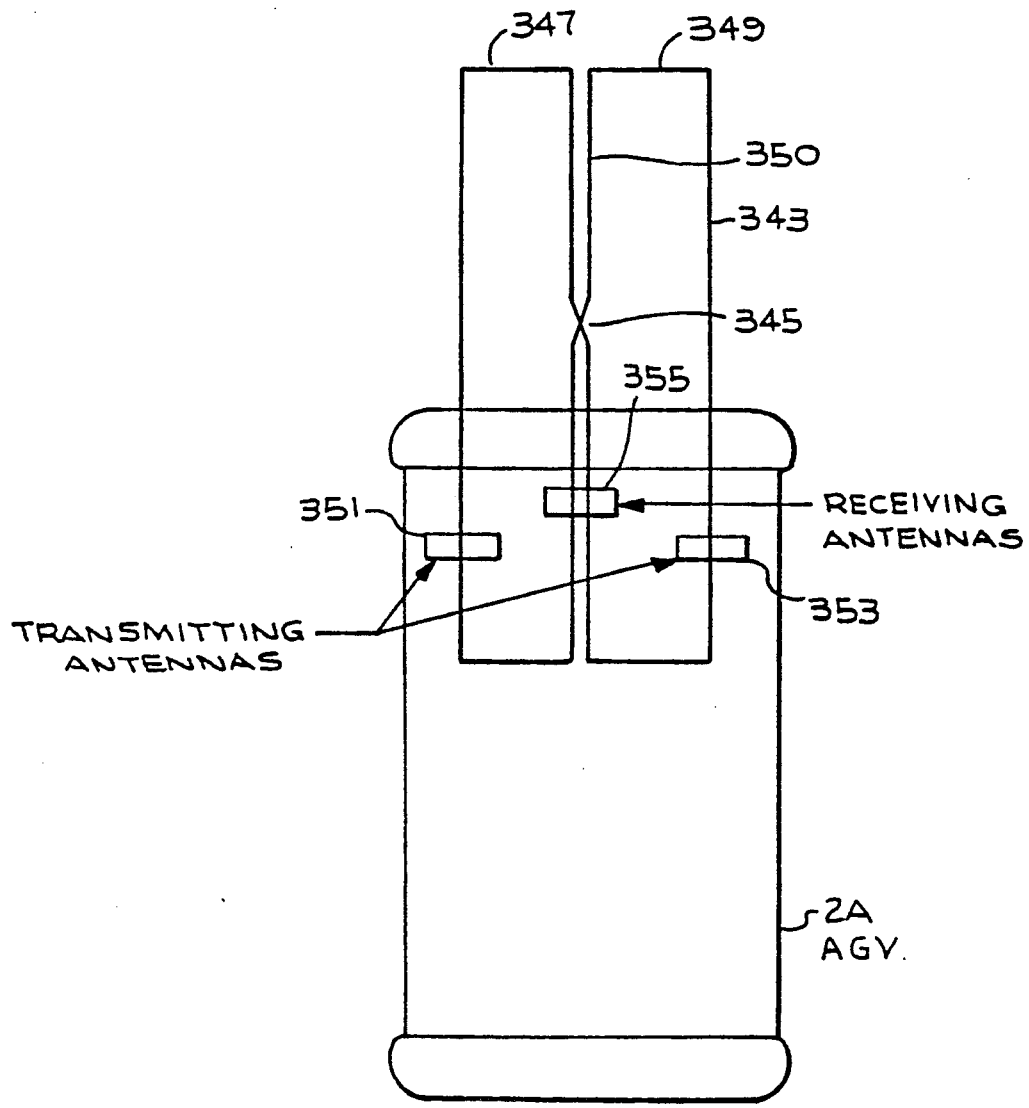
FIG. 30. Plan view showing an alternative embodiment having different transmitting antenna locations on a vehicle and a passive wire loop on the ground at a terminal, in which the two lobes of the passive wire loop are in a side-by-side configuration.

FIG. 30 illustrates an alternative technique for passive loop positioning of a vehicle in a terminal that is equipped with a passive loop. The passive loop 343 in this embodiment is a coil of wire with its ends connected together so as to form a closed loop, and which is flopped over at a point such as point 345 so that it forms a left-hand loop 347 and a right-hand loop 349.

Magnetic fields produced by current in the loop reinforce, i.e., they are additive, in the center leg 350 where two wire segments lie close to each other. The transmitting antenna system comprises two antennas (coils) 351 and 353, on separate cores, which are spaced apart by an amount that places them over the outside legs of the folded loop 343. The coils 351 and 353 are phased so as to reinforce each other in inducing current in the loop 343. The receiving antenna assembly 355 is the same as was described earlier.

Another Embodiment

An alternative embodiment of the terminal-positioning mode of the vehicle navigation and guidance apparatus processes the received signals differently than described above. This alternative embodiment is adequately describable without a separate figure. It has equipment that subtracts the two rectified signals that come from the rectifiers 113, 115 of FIG. 12A. Their difference is a voltage approximately proportional to the lateral position of the vehicle. In this embodiment it is best for the two direct signals from the transmitting antenna assembly 71, which are received by the two receiving coils 95, 97, to be of equal strength. Equality of direct signals is achieved by adjusting the position of the receiving antenna assembly 91 with respect to the transmitting antenna assembly 71.

Automatic Bias-Setting Embodiment

An alternative embodiment provides automatic setting of the biases 129A and 129B of FIG. 12B; such automatic setting is a calibration step for the Proportional Positioning System. Bias setting compensates for an undesired offset of the receiving antenna's signal (see FIG. 7), caused by energy that is directly magnetically coupled from the transmitting antenna 71 to the receiving antenna 91 (i.e., energy not received via the passive loop 55).

The Proportional Positioning System is a portion of the AGV described elsewhere herein. It includes, as shown on FIG. 4B, the on-board magnetic transmitter 68, the passive loop 54, the lateral-position antenna of block 47, the lateral-channel preamplifier 109, the Passive Lateral Subchannel including terminals 113A and 118, and the A/D converter 135.

The preamplifier 109 is shown again in the more detailed schematic diagram of FIG. 12A, whose circuit is continued on FIG. 12B. FIGS. 12A and 12B, whose output is at terminal 118, depict only a manual bias-setting circuit, 129A and 129B.

In the alternative automatic embodiment (FIG. 31) now to be described, the signal at a bias terminal 361 is an automatically controlled zero-to-five-volt bias for offsetting the direct magnetic coupling component from the transmitting antenna 71. The automatic bias-setting circuit as a whole is a closed loop that, during calibration, provides whatever voltage is necessary at terminal 361 to make the voltage at terminal 362 equal zero.

The automatic bias-setting circuit makes precise adjustment of the location of the transmitting antenna unnecessary and enables easy compensation for aging of components, etc. Circuitry of this type is preferably provided for both of the receiving coils 95, 97.

Figure 31:
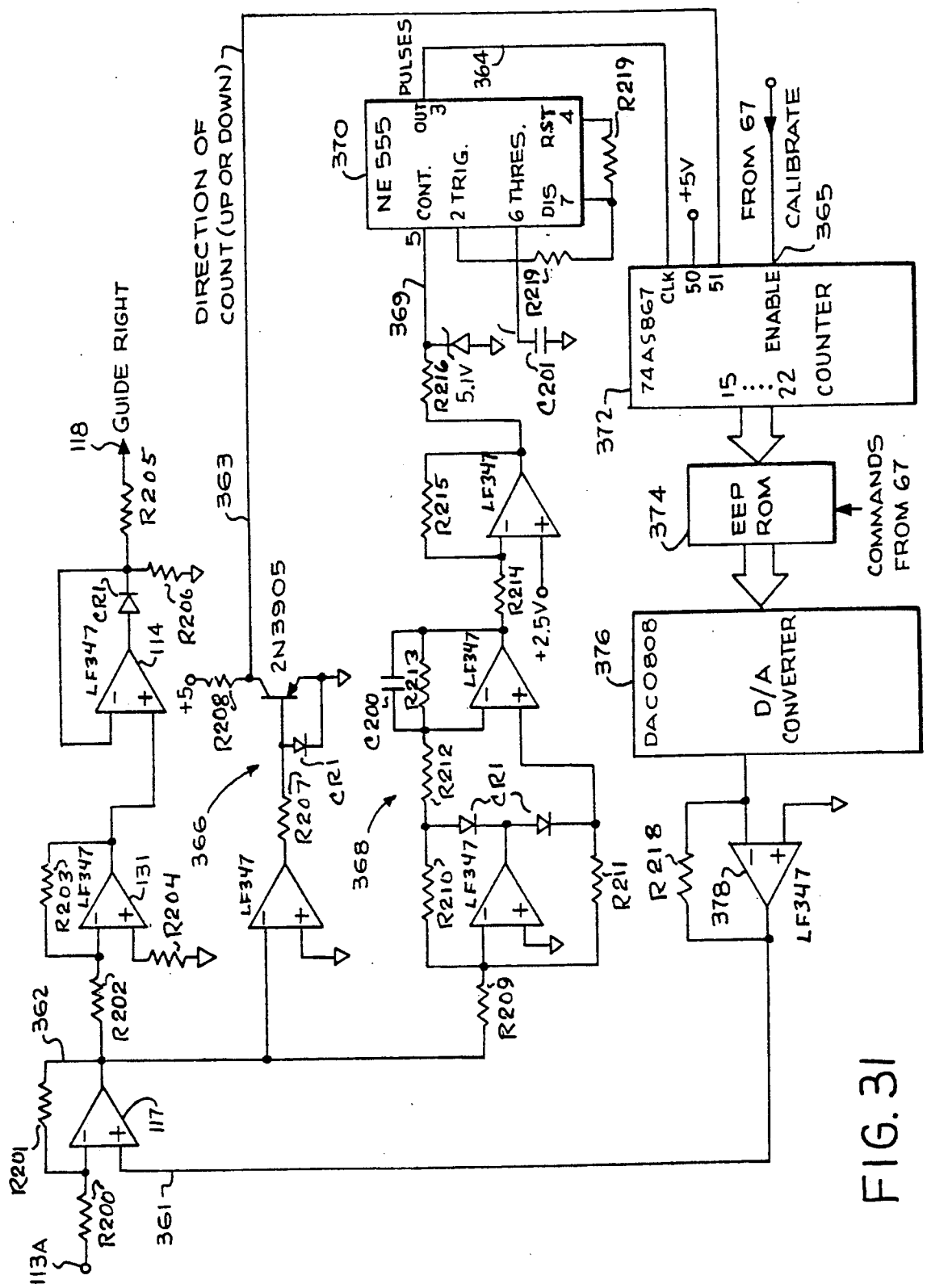
FIG. 31. A circuit diagram reproducing circuits from the top line of FIG. 12B and showing thereto connected circuits for calibration of an automatic offset adjustment which compensates for offsets in antenna null measurements.

The components of the automatic circuit and their interconnections are shown in the circuit diagram of FIG. 31. To show how the circuit interfaces with the other AGV circuits, the top line of FIG. 12B is reproduced as the top line of FIG. 31, except with the automatic bias circuit replacing the manual bias circuit 129A.

As seen in FIG. 31, an analog signal at output terminal 362 of amplifier 117 is conducted to a digitizing circuit 366, which consists of an inverting amplifier and a transistor clipping circuit. Circuit 366 produces a logic 1 level at its output terminal 363 if the signal at terminal 362 is positive, and a logic 0 level at terminal 363 if terminal 362 is negative.

Terminal 363 is connected to a counter 372, which also has a clock input terminal 364 for receiving pulses that are to be counted. The direction of counting is determined by the logic level of terminal 363. The count is incremented upon occurrence of a clock pulse if terminal 363 currently has a logic 1, and decremented if terminal 363 has a logic 0. Counter 372 is a model 74AS867, manufactured commercially by the Company of Texas Instruments Inc., Dallas, Tex., 75265.

Another subcircuit 368 performs the function of generating clock pulse signals at a controllable frequency. The absolute-value circuit 368, whose input is at terminal 362, provides an analog voltage at an output terminal 369. The analog voltage at 369 is the magnitude of the signal of terminal 362, so terminal 369 is never negative, irrespective of the polarity of the bipolar signal at terminal 362.

Terminal 369 is connected to a voltage-controlled digital oscillator 370; it produces output pulses at a frequency that depends upon the control voltage at terminal 369. The oscillator 370 provides output pulses at a terminal 364, which are conducted to the clock input terminal of the counter 372. The oscillator 370 is a model NE555, manufactured commercially by Texas Instruments, Inc., Dallas, Tex., 75265.

The count contents of the counter 372 are connected to an EEPROM (Electronically Erasable Programmable Read-Only Memory) 374, which is optional in this circuit. The EEPROM is capable of storing the count when it is commanded to do so by the outer loop microprocessor 67. The output of the EEPROM is connected to a (digital-to-analog) converter 376, which is a model DAC0808, manufactured commercially by National Semiconductor Company of Santa Clara, Calif., 58090.

The analog output of the D/A converter 376 is inverted in an amplifier 378, whose output is connected to the bias terminal 361 of the amplifier 117.

Operation of the circuit is as follows. The calibration process is performed at a time when the vehicle is not over a wire. At such a time antenna 91 is not receiving any component of signal via wires on the ground. To start a calibration (bias setting) the outer loop microprocessor 67 sends a calibration-command bit to an "enable" terminal 365 of the counter 372.

If the voltage at terminal 362 is negative, the binary signal at terminal 363 is low, which causes the direction of counting of the counter 372 to be downward. The decreasing count passes through the EEPROM 374 and causes the D/A converter 376 to receive less input current, causing the voltage at the bias terminal 361 to increase. That makes the voltage at terminal 362 less negative, so the 362 voltage moves toward a null.

Conversely, if terminal 362 is positive, the signal at terminal 363 goes high, which causes the counter 372 to count upward, and causes the D/A converter 376 to receive more input current, causing the voltage of terminal 361 to decrease. Thereupon, the voltage at terminal 362 decreases toward zero.

The frequency of pulses at the clock input terminal of the counter 372 depends inversely upon the magnitude of the voltage at terminal 362; a greater magnitude results in a greater frequency of the pulses that are counted by the counter 372. Consequently the offset calibration signal at terminal 361 approaches a final value faster when it has farther to go. It reaches a final value when the voltage at terminal 362 is zero, which reduces the counting rate at terminal 364 to zero. The counter 372 retains its count contents, so the proper bias voltage remains on the bias terminal 361.

If the optional EEPROM 374 is provided, the vehicle need not be calibrated anew every time it is started. After a calibration the EEPROM is commanded by the outer loop microprocessor 67 to read the output of the counter 372 and store the value in its memory. The EEPROM therefore can reproduce the count that was in the counter 372 just before the power was turned off, and if it is still an appropriate value the calibration need not be repeated.

The following table comprises a list of components and component types or values for circuits seen in FIGS. 6, 12A, 12B, 15, 16A, 16B, 17A, 17B, 18, 19, 20, 21, 22, and 31:

| Component (units in micro-Farads unless otherwise noted) | |
|---|---|
| Capacitors | Value |
| C3 | .22 |
| C6 | .22 |
| C9 | .1 |
| C9' | .01 |
| C10 | 2.2 |
| C12 | 1 |
| C15 | .27 |
| C16 | .22 |
| C17' | 1 |
| C19 | 10 |
| C20 | 10 |
| C21 | 10 |
| C22 | 10 |
| C23 | 10 |
| C24 | 10 |
| C25 | .847 |
| C27 | 10 |
| C28 | .047 |
| C28' | 8.8 |
| C29 | 10 |
| C31 | .1 |
| C31' | 8.8 |
| C32 | 10 |
| C34 | .1 |
| C35 | .1 |
| C38 | 10 |
| C38' | 2.2 |
| C41 | .22 |
| C47 | 2.2 |
| C48 | 4700 |
| C49 | .022 |
| C50 | .1 |
| C51 | .0047 |
| C52 | .0047 |
| C59 | .847 |
| C60 | .047 |
| C61 | .22 |
| C67 | 2.2 |
| C68 | 4700 |
| C69 | .022 |
| C70 | .1 |
| C72 | 10 |
| Diodes | Value or Type |
| CR1 | 1N4148 |
| CR2 | 1N4848 |
| CR3 | 1N5234 |
| CR4 | 1N5234 |
| CR5 | 1N4148 |
| CR6 | 1N4148 |
| CR8 | 1N4148 |
| CR10 | 1N4148 |
| CR11 | 1N5234 |
| CR12 | 1N5234 |
| CR13 | 1N4148 |
| CR14 | 1N4148 |
| CR17 | 1N4148 |
| CR18 | 1N4148 |
| CR19 | 1N4148 |

-continued

| Component (units in micro-Farads unless otherwise noted) | |
|---|---|
| CR23 | 1N4148 |
| CR24 | 1N4148 |
| CR25 | 1N4148 |
| CR26 | 1N4148 |
| CR27 | 1N4148 |
| CR28 | 1N4148 |
| CR29 | 1N4148 |
| CR30 | 1N4148 |
| CR31 | 1N4148 |
| CR32 | 1N4148 |
| Switches and Gates | Type |
| U1 | LF11202D |
| U11 | DC383 |
| U12 | 7402 |
| U13 | 7402 |
| U14 | LF11202D |
| U17 | LF11202D |
| U24 | LF11202D |
| U29 | LF11202D |
| U30 | 7404 |
| Inductors | Value or Type |
| L1 | 50 mH |
| L2 | 50 mH |
| L3 | 50 mH |
| L4 | 72.4 mH |
| L7 | 72.4 mH |
| L8 | 50 mH |
| L9 | 50 mH |
| L10 | 50 mH |
| L11 | 72.4 mH |
| L12 | 72.4 mH |
| Jumpers | |
| E1 | |
| E2 | |
| Operational Amplifiers | Value or Type |
| U2 | LF347 |
| U4 | LF347 |
| U5 | LF347 |
| U5' | LM675T |
| U6 | LM675T |
| U8 and U8' | LF347 |
| U19 | LF347 |
| U20 | LF347 |
| U23 | LF347 |
| U25 | LF347 |
| U26 | LF347 |
| U28 | LF347 |
| Resistors | Value (in ohms) |
| R2 | 301 |
| R3 | 3.57K |
| R4 | 63.4K |
| R4' | 165K |
| R5 | 1K |
| R5' | 15K |
| R6 | 1.4K |
| R6' | 1K |
| R7 | 1K |
| R7' | 301 |
| R8 | 1K |
| R8' | 3.57K |
| R9 | 12.1K |
| R9' | 80.6K |
| R10 | 1K |
| R10' | 165K |
| R11 | 165K |
| R11' | 100K |
| R12 | 10K |
| R13 | 1.4K |
| R13' | 10K |
| R14 | 1K |
| R14' | 10K |
| R15 | 1K |
| R15' | 100K |
| R16 | 27.4K |
| R16' | 10K |

-continued

| Component (units in micro-Farads unless otherwise noted) | |
|---|---|
| R17 | 165K |
| R18 | 1K |
| R18' | 69.8K |
| R18" | 10K |
| R19 | 10K |
| R19' | 499 |
| R20 | 1K |
| R20' | 33.2K |
| R21 | 38.3K |
| R21' | 1M |
| R22 | 80.6K |
| R22' | 165K |
| R23 | 1K |
| R23' | 100K |
| R24 | 10K |
| R24' | 100 |
| R25 | 10K |
| R25" | 100 |
| R26 | 10K |
| R26' | 22.1K |
| R27 | 10K |
| R27' | 121 |
| R28 | 10K |
| R28' | 100 |
| R29 | 10K |
| R29' | 200K |
| R30 | 10K |
| R30' | 110K |
| R31 | 20K |
| R31' | 51.1K |
| R32 | 2.74K |
| R32' | 4.99K |
| R33 | 1 ohm ½ watt |
| R33' | 8.06K |
| R34 | 1 |
| R34' | 1K |
| R35 | 9.1K |
| R36 | 1.1K |
| R37 | 110K |
| R38 | 10K |
| R39 | 10K |
| R40 | 1 |
| R40' | 221K |
| R41 | 127K |
| R41' | 10K |
| R42 | 15.4K |
| R42' | 10K |
| R43 | 10K |
| R44 | 1K |
| R45 | 10K |
| R47 | 604K |
| R49 | 1K |
| R50 | 10K |
| R51 | 49.9K |
| R52 | 10K |
| R53 | 10K |
| R54 | 604K |
| R55 | 49.9K |
| R56 | 20K |
| R57 | 1K |
| R58 | 20K |
| R59 | 1K |
| R60 | 100 |
| R61 | 1K |
| R61' | 1K |
| R62 | 137K |
| R62' | 100 |
| R63 | 15K |
| R63' | 100 |
| R64 | 1.4K |
| R65 | 1K |
| R66 | 1K |
| R67 | 12.1K |
| R68 | 137K |
| R69 | 137K |
| R70 | 10K |
| R71 | 1.4K |
| R72 | 1K |
| R73 | 1K |
| R74 | 27.4K |

-continued

| Component (units in micro-Farads unless otherwise noted) | |
|---|---|
| R75 | 137K |
| R76 | 10K |
| R77 | 10K |
| R78 | 1K |
| R79 | 1M |
| R80' | 165K |
| R81 | 100K |
| R81' | 100 |
| R82 | 10K |
| R83 | 10K |
| R84 | 10K |
| R85 | 10K |
| R86 | 10K |
| R87 | 200K |
| R88 | 10K |
| R89 | 20K |
| R90 | 4.99K |
| R91 | 8.06K |
| R92 | 1K |
| R97 | 100K |
| R98 | 100K |
| R107 | 845K |
| R108 | 165K |
| R109 | 1.4K |
| R110 | 15K |
| R111 | 13.3K |
| R112 | 49.9K |
| R113 | 165K |
| R114 | 845K |
| R115 | 4.99K |
| R116 | 10K |
| R117 | 10K |
| R118 | 9.09K |
| R119 | 4.53K |
| R120 | 27.4K |
| R121 | 56.2K |
| R122 | 22.1K |
| R124 | 28.7K |
| R126 | 28.7K |
| R127 | 8.06K |
| R128 | 25.5K |
| R129 | 23.2K |
| R133 | 25.5K |
| R134 | 8.06K |
| R136 | 100K |
| R137 | 49.9K |
| R138 | 49.9K |
| R139 | 100K |
| R141 | 10K |
| R142 | 10K |
| R143 | 10K |
| T144 | 10K |
| R145 | 100 |
| R146 | 100 |
| R147 | 10K |
| R148 | 10K |
| R149 | 1K |
| R150 | 10K |
| R151 | 10K |
| R152 | 100 |
| R153' | 1K |
| R154 | 35.7K |
| R155 | 35.7K |
| R156 | 1.21K |
| R157 | 15K |
| R158 | 15K |
| R159 | 47.5K |
| R160 | 82.5K |
| R161 | 845K |
| R162 | 165K |
| R163 | 1.4K |
| R167 | 165K |
| R168 | 845K |
| R164 | 15K |
| R165 | 13.3K |
| R166 | 49.9K |
| R169 | 4.99K |
| R170 | 10K |
| R171 | 10K |
| R172 | 9.09K |

-continued

| Component | |
|---|---|
| (units in micro-Farads unless otherwise noted) | |
| R173 | 4.53K |
| R174 | 10K |
| R175 | 10K |
| R176 | 27.4K |
| R177 | 56.2K |
| R178 | 22.1K |
| R180 | 47.5K |
| R181 | 47.5K |
| R182 | 3.32K |
| R183 | 10K |
| R183' | 27.4K |
| R184 | 100K |
| R185 | 100K |
| R187 | 10K |
| R189 | 10K |
| R190 | 150K |
| R191 | 10K |
| R192 | 1K |
| R200 | 10K |
| R201 | 10K |
| R202 | 1K |
| R203 | 20K |
| R204 | 1K |
| R205 | 100 |
| R206 | 2K |
| R207 | 2K |
| R208 | 2K |
| R209 | 10K |
| R210 | 10K |
| R211 | 10K |
| R212 | 10K |
| R213 | 100K |
| R214 | 10K |
| R215 | 10K |
| R216 | 1K |
| R217 | 3.3K |
| R218 | 10K |
| R219 | 3.3K |

| Transistors | Value or Type |
|---|---|
| Q1 | 2N2222 |
| Q2 | 2N2222 |
| Q3 | 2N2222 |
| Q4 | 2N2222 |
| Q5 | 2N2222 |

Although the invention has been illustrated by describing only particular preferred embodiments, its scope is not limited to them. The scope is determined by the claims.

We claim:

1. Apparatus for use with an automatic guided vehicle propelled contiguously along a surface on surface engaging means, comprising:
    transmitting means on the vehicle for providing a time-varying primary magnetic field;
    passive loop means at said surface for receiving said time-varying primary magnetic field and carrying an electric current induced thereby in said loop means, which produces a secondary magnetic field having a predetermined pattern;
    receiving means disposed on said vehicle for sensing said secondary magnetic field and providing time varying signals in response thereto;
    said vehicle having a longitudinal axis of substantially forward and reverse travel and said receiving means being oriented on the vehicle so as to receive said secondary magnetic field when a portion of said loop means extends laterally across said longitudinal axis of said vehicle at said receiving means;
    signal processing means for receiving said signals and processing them to provide information as to said vehicle's longitudinal position.

2. Apparatus as in claim 1 and wherein said passive loop means at said surface comprises at least one closed loop of electrically conductive wire.

3. Apparatus as in claim 1 and wherein said receiving means comprises a set of magnetic detectors including:
    a first magnetic detector positioned at a first predetermined longitudinal position on the vehicle for detecting magnetic field at said first position;
    a second magnetic detector positioned at a second longitudinal position on the vehicle to the rear of said first detector, for detecting a magnetic field at said second position;
    a third magnetic detector positioned at a third longitudinal position on the vehicle to the rear of said second detector, for detecting a magnetic field at said third position;
    each of said three detectors providing front signals, middle signals, and rear signals, respectively;
    and wherein said signal processing means comprises logic means for processing said three detectors' signals to ascertain the longitudinal position of said vehicle relative to said axis-crossing portion of said loop means.

4. Apparatus as in claim 3 and wherein said magnetic detectors comprise coils of wire on magnetic core material.

5. Apparatus as in claim 3 and further comprising:
    a second set of front, middle, and rear magnetic detectors on said vehicle, each detector for sensing a magnetic field and providing a signal;
    said two front magnetic detectors being connected such that each output signal from the two front magnetic detectors reinforces the other output signal from the two front magnetic detectors when both output signals from the two front magnetic detectors result from the same-phase magnetic field excitation, and said two middle detectors are connected such that each output signal from the two middle detectors reinforces the other output signal for the two middle magnetic detectors when both output signals from the two middle detectors result from the same-phase magnetic field excitation, and said two rear detectors are connected such that each output signal from the two rear detectors reinforces the other output signal from the two rear detectors when both output signals from the two rear detectors result from the same-phase magnetic field excitation; whereby three summed signals are provided; and,
    said logic means for processing the signals comprising means for logically combining said three summed signals to detect the longitudinal position of said vehicle at a predetermined area on the surface when at least one of said two sets of detectors produces signals.

6. Apparatus as in claim 1 and wherein said passive loop means for receiving said primary magnetic field and producing a secondary magnetic field comprises two loop configurations of electrical current conductor disposed side-by-side.

7. Apparatus as in claim 1 and further comprising terminal-positioning apparatus comprising:
    means for receiving said information provided by said signal-processing means and means for controlling movement of said vehicle in response to said received information.

8. Apparatus as in claim 7 and wherein said surface has a plurality of such loop means, each at a different respective loop location, and said apparatus further comprises:
   main guidance equipment disposed on the vehicle for guiding the vehicle even when the vehicle is not at a loop location;
   said main guidance equipment comprising navigation and guidance means for recognizing when the vehicle is at a loop location and for providing an arrival signal thereupon;
   means for receiving said arrival signal and means for transferring control of said vehicle from said main guidance equipment to said loop guidance apparatus when at a loop location.

9. Apparatus as in claim 8 wherein the receiving means comprise means for sensing said secondary magnetic field essentially symmetrically disposed about a middle detection means whereby said vehicle is operatively bidirectionally guided over the loop.

10. Apparatus as in claim 1 wherein the receiving means comprise means for automatically calibrating a bias setting whereby an undesired offset in the receiving means caused by energy that is directly magnetically coupled to the receiving means from the transmitter means is nulled.

11. Apparatus for use with an automatic guided vehicle propelled contiguously along a surface on surface-engaging means, comprising:
   transmitting means on the vehicle for providing a time-varying primary magnetic field;
   passive loop means at said surface for receiving said time-varying primary magnetic field and carrying an electric current induced thereby in said loop means, which produces a secondary magnetic field having a predetermined pattern;
   receiving means disposed on said vehicle for sensing said secondary magnetic field and providing time varying signals in response thereto;
   said vehicle having a longitudinal axis generally common to forward and reverse travel and said receiving means being oriented on the vehicle so as to receive said secondary magnetic field when a portion of said loop means extends laterally across said longitudinal axis of said vehicle at said receiving means;
   signal processing means for receiving said signals and processing them to provide information as to said vehicle's longitudinal position at a predetermined area on the surface;
   said transmitting means on the vehicle comprises:
      oscillator means for providing an alternating electrical signal; and
      transmitting means connected with said oscillator means for providing said time-varying primary magnetic field.

12. Apparatus as in claim 11 and wherein said transmitting means comprises means for providing said primary magnetic field as an alternating field at a predetermined frequency, and said secondary magnetic field comprises a field also alternating at the predetermined frequency, and wherein at least one of said receiving means and said signal processing means comprises a bandpass filter having a pass band for passing signals of said predetermined frequency and rejecting other frequencies outside the pass band.

13. Apparatus as in claim 11 and wherein said transmitting means comprises one magnetic core encircled by at least one current-conductive coil.

14. Apparatus as in claim 11 and wherein:
   said transmitting means comprise magnetic core means, comprising two spaced apart transmitter magnet means each of which are encircled by at least one current-conductive coil for producing portions of said primary magnetic field;
   said two magnetic core means being laterally spaced apart on said vehicle; and,
   said passive loop means includes two loop portions that are similarly laterally spaced apart so that each loop portion is magnetically coupled simultaneously with a respective one of said two spaced-apart transmitter magnets;
   whereby both transmitter magnet means are able to induce current into said loop means.

* * * * *